United States Patent
Schwab

(10) Patent No.: US 9,242,680 B2
(45) Date of Patent: Jan. 26, 2016

(54) CARGO BED FOR UTILITY VEHICLE

(71) Applicant: YAMAHA MOTOR MANUFACTURING CORP. OF AMERICA, Newnan, GA (US)

(72) Inventor: Andrew Schwab, Newnan, GA (US)

(73) Assignee: YAMAHA MOTOR MANUFACTURING CORPORATION OF AMERICA, Newnan, GA (US)

( * ) Notice: Subject to any disclaimer, the term of this patent is extended or adjusted under 35 U.S.C. 154(b) by 7 days.

(21) Appl. No.: 14/312,940

(22) Filed: Jun. 24, 2014

(65) Prior Publication Data

US 2015/0367895 A1    Dec. 24, 2015

(51) Int. Cl.
*B62D 33/033* (2006.01)
*B62D 29/04* (2006.01)

(52) U.S. Cl.
CPC ............ *B62D 33/033* (2013.01); *B62D 29/043* (2013.01)

(58) Field of Classification Search
CPC . B62D 33/033; B62D 33/0273; B62D 29/043
USPC ...................... 296/24.4, 50, 52, 60
See application file for complete search history.

(56) References Cited

U.S. PATENT DOCUMENTS

| | | | | |
|---|---|---|---|---|
| 95,712 | A * | 10/1869 | Moore | B62D 33/0273 296/52 |
| 1,235,361 | A * | 7/1917 | Monethei | B62D 25/04 296/30 |
| 5,711,569 | A * | 1/1998 | Sovoda | B62D 33/033 296/57.1 |
| 6,863,328 | B2 * | 3/2005 | Kiester | B62D 33/08 296/24.4 |
| 7,229,115 | B2 * | 6/2007 | Wilson | B60R 13/01 296/24.4 |
| 7,971,919 | B2 * | 7/2011 | Vertanen | B60P 3/40 296/3 |
| 2004/0031639 | A1 * | 2/2004 | Deves | B62D 33/03 180/311 |
| 2007/0216195 | A1 | 9/2007 | Furman | |

* cited by examiner

*Primary Examiner* — Jason S Morrow
*Assistant Examiner* — E Turner Hicks
(74) *Attorney, Agent, or Firm* — Keating and Bennett, LLP

(57) ABSTRACT

A cargo bed for a utility vehicle includes a bed portion including a left-side wall portion and a right-side wall portion and a rear opening between rear ends of the side wall portions, and a tail gate to close the rear opening of the bed portion. The side wall portions include a pair of first left and right groove portions extending along an up-down direction at a rear end of the side wall portions. The left-side and right-side wall portions further include a pair of second left and right groove portions disposed forward with respect to the pair of first groove portions and extending along the up-down direction at the left-side and right-side wall portions. The pairs of first and second groove portions are arranged such that a left end and a right end of the tail gate are each slidable in the up-down direction and the tail gate is held removably.

19 Claims, 21 Drawing Sheets

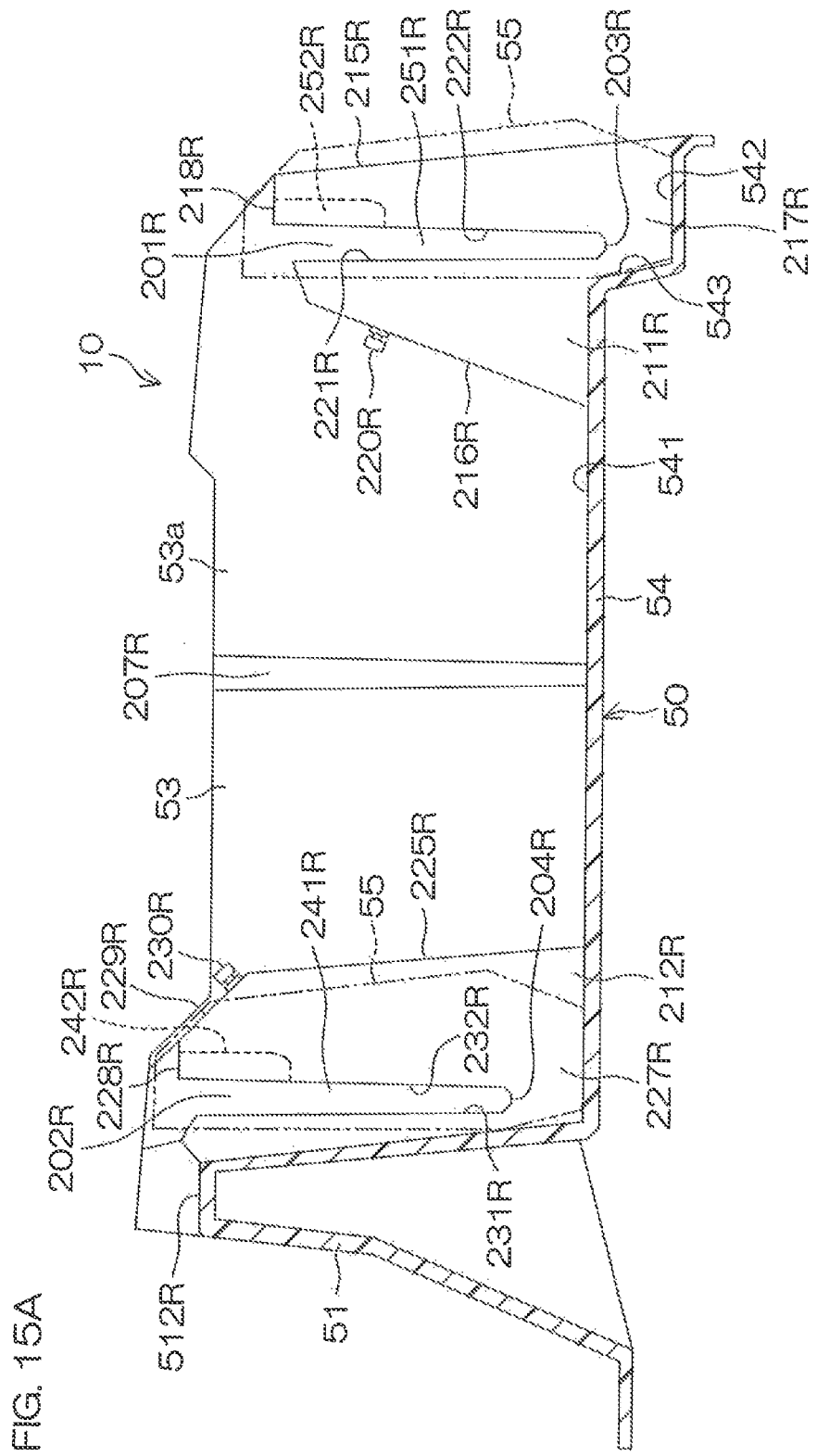

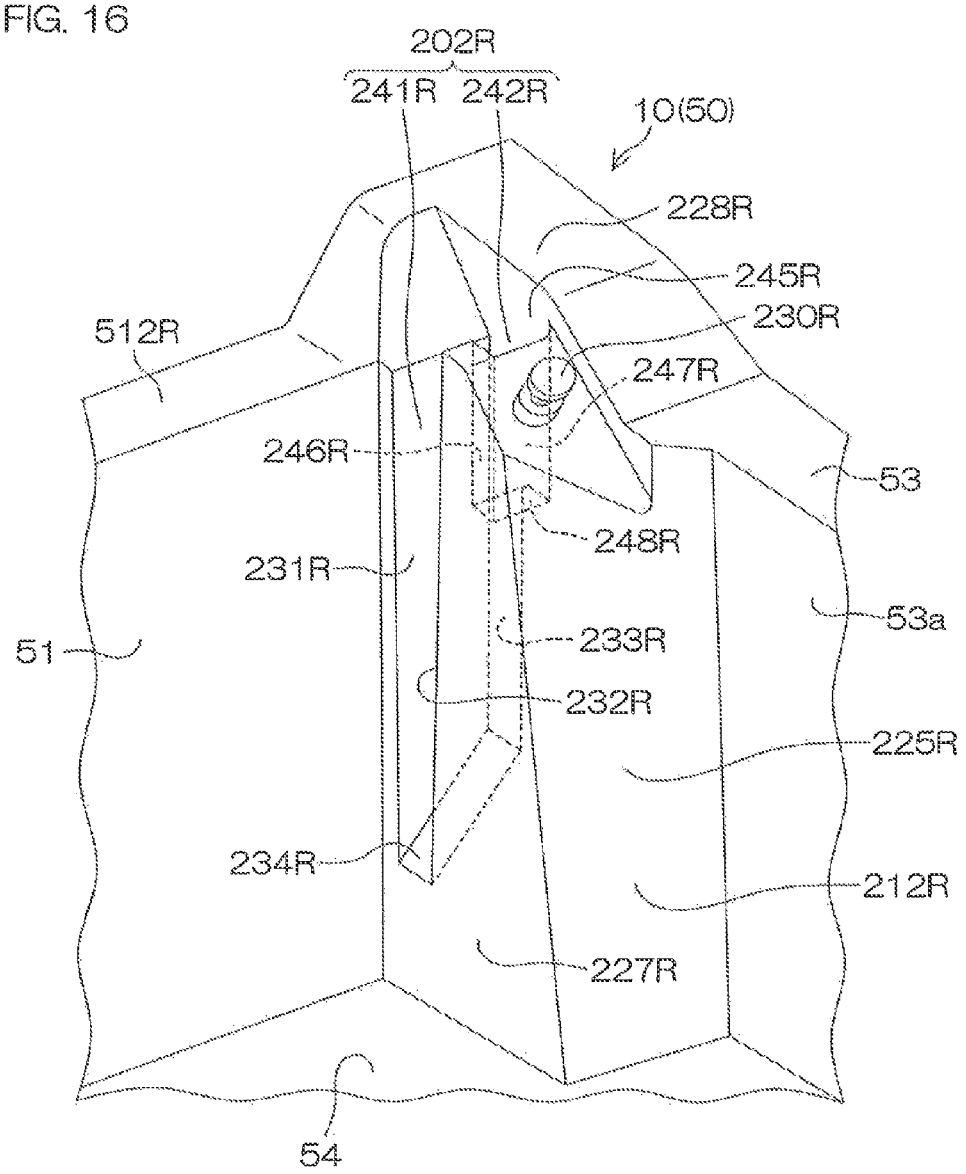

CARGO BED FOR UTILITY VEHICLE

BACKGROUND OF THE INVENTION

1. Field of the Invention

The present invention relates to a cargo bed for a utility vehicle.

2. Description of the Related Art

US 2007/0216195A1 discloses a cargo bed for a utility vehicle. The utility vehicle includes a plurality of wheels, a body, a seat assembly, and a cargo bed. The body is supported by the plurality of wheels. The seat assembly and the cargo bed are attached to the body. The cargo bed includes a base, a front wall, a tail gate, a right side wall, and a left side wall. A flange is arranged at a rear end of the cargo bed, and a lower end edge of the tail gate is removably coupled to the flange. As a result, the tail gate can be pivoted about the lower end edge. Near an upper end edge of the tail gate, a pair of lock mechanisms respectively coupled to the right side wall and the left side wall are provided. When the lock mechanisms are unlocked, the tail gate can be pivoted rearward about the lower end edge and an opening between the right side wall and the left side wall is opened rearward.

US 2004/0031639A1 discloses another utility vehicle. The utility vehicle is provided with a cargo area. The cargo area includes a seat and a seatback. The seatback is hinged to the seat, and the seatback can be fully folded down onto the seat. The seat is hinged to a floor of the cargo area. As a result, the seat and the seatback can be pivoted to a substantially vertical orientation at a rear end of a cargo area floor.

SUMMARY OF THE INVENTION

The inventor of preferred embodiments of the present invention described and claimed in the present application conducted an extensive study and research regarding a cargo bed for a utility vehicle, such as the one described above, and in doing so, discovered and first recognized new unique challenges and previously unrecognized possibilities for improvements as described in greater detail below.

The utility vehicle in US 2007/0216195A1 is configured such that the tail gate can be removed from the cargo bed. However, it is not possible to hold the removed tail gate on the utility vehicle.

The utility vehicle in US 2004/0031639A1 is configured such that the seat and the seatback are moved to the cargo area rear end so as to be used as a tail gate. However, the number of steps required to move the seat and the seatback is large. Further, a mechanism to enable movement of the seat and the seatback is complicated.

A preferred embodiment of the present invention includes a cargo bed configured to allow easy removal of a tail gate with a simple structure and work, and to hold the removed tail gate on a utility vehicle, and a utility vehicle provided with the same.

A preferred embodiment of the present invention includes a cargo bed for a utility vehicle that includes a bed portion including a left-side wall portion and a right-side wall portion and a rear opening between rear ends of the left-side and right-side wall portions, and a tail gate that closes the rear opening of the bed portion. The left-side and right-side wall portions include a first left groove portion and a first right groove portion (hereinafter, may be collectively referred to as "first groove portions") extending along an up-down direction at the rear end of the left-side and right-side wall portions. The first left and right groove portions are arranged such that a left end and a right end of the tail gate are each slidable in the up-down direction and the tail gate is held removably at a first position at which the rear opening is closed. Moreover, the left-side and right-side wall portions further include a second left groove portion and a second right groove portion (hereinafter, may be collectively referred to as "second groove portions") disposed forward with respect to the first left and right groove portions and extending along the up-down direction at the left-side and right-side wall portions. The second left and right groove portions are arranged such that the left end and the right end of the tail gate are each slidable in the up-down direction and the tail gate is held removably at a second position which is forward with respect to the first position.

According to this arrangement, when the tail gate is inserted into the first left and right groove portions, it is possible to hold the tail gate at the first position. The tail gate held at the first position closes the rear opening of the bed portion. When the tail gate held at the first position is slid in the up-down direction, it is possible to remove the tail gate from the first left and right groove portions. When the tail gate removed from the first left and right groove portions is inserted into the second left and right groove portions, it is possible to hold the tail gate at the second position forward with respect to the first position. When the tail gate held at the second position is slid in the up-down direction, it is possible to remove the tail gate from the second left and right groove portions. In this manner, it is possible to hold, at the second position, the tail gate removed from the first position at which the rear opening is closed. In addition, the structure in which the first groove portions and the second groove portions are provided in the left-side and right-side wall portions is simple. Further, a work of attaching and detaching the tail gate to and from the first and second groove portions is simple, and accordingly, a work of moving the tail gate between the first and second positions is also simple.

In a preferred embodiment of the present invention, the tail gate includes a first principal surface and a second principal surface preferably having different surface structure. The first principal surface is an inner surface that defines a cargo accommodation space of the cargo bed in a state where the tail gate is held in the first left and right groove portions. The second principal surface is an outer surface that faces the opposite side of the cargo accommodation space of the cargo bed in a state where the tail gate is held in the first left and right groove portions. Therefore, the inner surface (first principal surface) and the outer surface (second principal surface) of the tail gate preferably have a different surface structure. That is, there is a correct posture in which the tail gate is correctly attached to the first groove portion.

In a preferred embodiment of the present invention, the first left and right groove portions are arranged to receive, in an attachment position, the tail gate in a regular posture in which the first principal surface is oriented forward, and to regulate the reception of the tail gate in the attachment position when the tail gate is in a back-to-front inverted posture in which the second principal surface is oriented forward. Thus, it is possible for a user to reliably attach the tail gate in the regular posture to the first left and right groove portions.

Similar to the first groove portions, the second left and right groove portions may be arranged to receive, in an attachment position, the tail gate in a regular posture in which the first principal surface is oriented forward, and to regulate the reception of the tail gate in the attachment position when the tail gate is in a back-to-front inverted posture in which the second principal surface is oriented forward. Alternatively, unlike the first left and right groove portions, the second left and right groove portions are preferably arranged to receive the tail gate in the attachment position in a posture other than the regular posture.

In a preferred embodiment of the present invention, the first left and right groove portions are arranged such that the insertion of the both ends of the tail gate in a back-to-front inverted posture in which the second principal surface is oriented forward is restricted to halfway of the attachment position. Thus, it is not possible to insert the tail gate in the back-to-front inverted posture beyond a middle halfway point of the first left and right groove portions, and therefore, a user reliably notices that the tail gate is not in the regular posture. Therefore, it is possible for a user to reliably attach the tail gate in the regular posture to the first left and right groove portions.

In a preferred embodiment of the present invention, the first left and right groove portions are arranged to receive, in a first attachment position, the tail gate in a regular posture in which the first principal surface is oriented forward, and the second left and right groove portions are arranged to receive, in a second attachment position, the tail gate in a regular posture in which the first principal surface is oriented forward. Thus, it is possible to attach the tail gate in the regular posture both to the first groove portions and to the second groove portions. Therefore, it is possible for a user to move the tail gate between the first groove portions (first position) and the second groove portions (second position) without changing the posture of the tail gate. This further simplifies the work of moving the tail gate.

In a preferred embodiment of the present invention, a gripping portion to grip the tail gate is provided on the first principal surface. In this arrangement, the gripping portion is provided on the first principal surface (inner surface) facing the cargo accommodation space, and thus, improves the ease of handling the tail gate without affecting the design of the outward facing second principal surface (outer surface).

In a preferred embodiment of the present invention, the bed portion further includes a front wall portion to connect front end edges of the left-side and right-side wall portions, the gripping portion is provided at an upper end of the tail gate, the second left and right groove portions are disposed at front ends of the left-side and right-side wall portions, and in a state where the tail gate in a regular posture in which the first principal surface is oriented forward is attached to the second left and right groove portions, at least a portion of the gripping portion of the tail gate is at a higher position than that of the upper end edge of the front wall portion. According to this arrangement, when the tail gate is attached to the second left and right groove portions, at least a portion of the gripping portion is exposed at a higher position than that of the front wall portion. Therefore, it is easy for a user to handle the tail gate because it is easy to access the gripping portion.

In a preferred embodiment of the present invention, the second left and right groove portions are disposed at front ends of the left-side and right-side wall portions. According to this arrangement, the tail gate held in the second left and right groove portions is positioned at the second position corresponding to the front end of the bed portion. Therefore, it is possible to hold the tail gate on the bed portion without greatly decreasing the volume of the cargo accommodation space on the bed portion.

In a preferred embodiment of the present invention, a lower end position of the second left and right groove portions is higher than a lower end position of the first left and right groove portions.

For example, the lower end position of the first groove portion is preferably arranged such that when the tail gate is completely attached, the bottom surface of the tail gate is lower than a cargo receiving surface of the bed portion. Thus, the tail gate held in the first groove portion reliably closes the rear opening. On the other hand, the lower end position of the second groove portion is preferably arranged such that when the tail gate is completely attached, the bottom surface of the tail gate substantially coincides with the cargo receiving surface of the bed portion. In this case, at the second position, the bed portion may not necessarily be provided with a depressed portion in which the lower end edge of the tail gate is received. As a result, it is possible to simplify the structure of the bed portion.

In a preferred embodiment of the present invention, the first left groove portion and the first right groove portion are provided, respectively, in a first left protruded portion and a first right protruded portion protruding inward from the rear end of the left-side and right-side wall portions. Further, the second left groove portion and the second right groove portion are provided, respectively, in a second left protruded portion and a second right protruded portion protruding inward from the left-side and right-side wall portions at a front with respect to the first left and right protruded portions. A distance between the left-side wall portion and the right-side wall portion between the first left and right protruded portions and the second left and right protruded portions is wider than distances between the first left and right protruded portions and between the second left and right protruded portions.

In this arrangement, the protruded portions are provided on the side wall portions, and thus, the side wall portions increase the strength of the cargo bed. The groove portions are provided in the protruded portions, and thus, it is possible to provide a structure to hold the tail gate while maintaining the strength required for the side wall portions. In a portion other than the protruded portions, a distance between the pair of side wall portions is wide, and thus, it is possible to secure a large cargo accommodation space.

In order to partition the cargo accommodation space in the front-back direction, partition-plate grooves are preferably each located at an intermediate portion, in the front-back direction, of the left-side and right-side wall portions. Each of the partition-plate grooves is preferably indented from the surface of the side wall portions so as not to decrease the cargo accommodation space. In this case, the partition plate has a width, in a left-right direction, longer than the distance between the left-side and right-side wall portions.

In a preferred embodiment of the present invention, a linkage member is further provided which links the tail gate and the bed portion in order to hold an attachment state of the tail gate to the first left and right groove portions or to the second left and right groove portions. The linkage member and the bed portion are coupled at different relative positions, relative to the tail gate, depending on a state where the tail gate is held by the first left and right groove portions and a state where the tail gate is held by the second left and right groove portions. In this arrangement, when the tail gate and the bed portion are linked by the linkage member, it is possible to hold the attachment state of the tail gate to the first groove portions or to the second groove portions. Depending on a state where the tail gate is attached to the first groove portions and a state where the tail gate is attached to the second groove portions, a relative position, relative to the tail gate, of the coupling position between the linkage members and the bed portion differs. Thus, it is possible to increase the design freedom with respect to the disposition of the first groove portions and the second groove portions, the posture of the tail gate when the tail gate is attached to the first groove portions and the second groove portions, and the disposition of the coupling positions between the linkage member and the bed portion, etc.

In a preferred embodiment of the present invention, both in a state where the tail gate is attached to the first left and right groove portions and in a state where the tail gate is attached to the second left and right groove portions, the linkage member and the bed portion are coupled at an inner position, of the bed portion, relative to the tail gate. With this arrangement, it is possible to couple the linkage members to the bed portion at an inner position of the bed portion when the tail gate is either at the first position or at the second position. Therefore, it is possible to provide, at an inner position of the bed portion, a coupling mechanism to couple the linkage member.

In a preferred embodiment of the present invention, a bed hook provided in the bed portion is further included, and at a lower end of the tail gate, a depressed portion to avoid the bed hook when attached to the second left and right groove portions is provided at a position corresponding to the bed hook. With this arrangement, it is possible to hold the tail gate at the second position while avoiding the bed hook. Therefore, even when the tail gate is held at the second position, the bed hook is capable of being used.

In a preferred embodiment of the present invention, the tail gate is preferably made from a resin material, for example. With this arrangement, it is possible to easily manufacture a tail gate having both ends that are inserted into the first and second groove portions. Further, the tail gate made from the resin material contributes to a weight saving of the cargo bed, and thus, contributes to a weight saving of the utility vehicle.

In a preferred embodiment of the present invention, the left-side and right-side wall portions are preferably made from a resin material, for example. With this arrangement, it is possible to easily manufacture left-side and right-side wall portions including the first and second groove portions. Further, the side wall portions made from the resin material contribute to a weight saving of the cargo bed, and thus, contribute to a weight saving of the utility vehicle.

Due to a similar reason, it is preferable that the bed portion and/or the front wall portion are made from a resin material. It is further preferable that the entire cargo bed is made from a resin material.

In a preferred embodiment of the present invention, a utility vehicle is provided including the cargo bed having the above-described features. Thus, it is possible to provide a utility vehicle capable of moving a tail gate and holding the tail gate on the utility vehicle with a simple structure.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15A is an illustrative vertical sectional view for describing the structure of a right-side wall portion of the cargo bed,
FIG. 16 is an enlarged perspective view showing the arrangement of a second right groove portion.

DETAILED DESCRIPTION OF THE PREFERRED EMBODIMENTS

In the description of preferred embodiments below, front-back, left-right, and up-down are directions defined with reference to a viewpoint of a driver seated on a seat unit of a vehicle while facing a steering wheel. Further, the description is made with reference to a state where the vehicle is on a horizontal surface.

Figure 1:
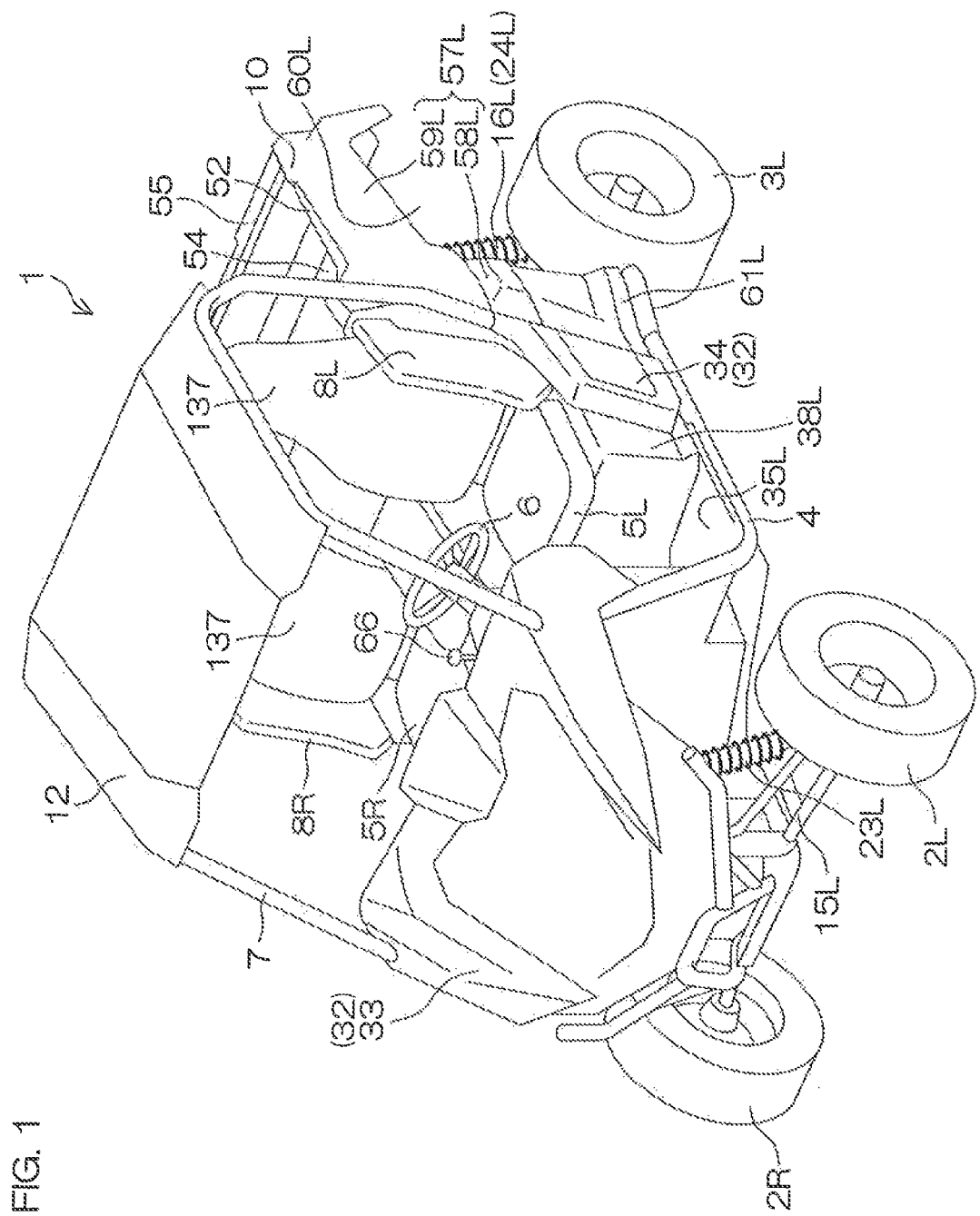
FIG. 1 is a perspective view of a vehicle according to a preferred embodiment of the present invention.
Figure 2:
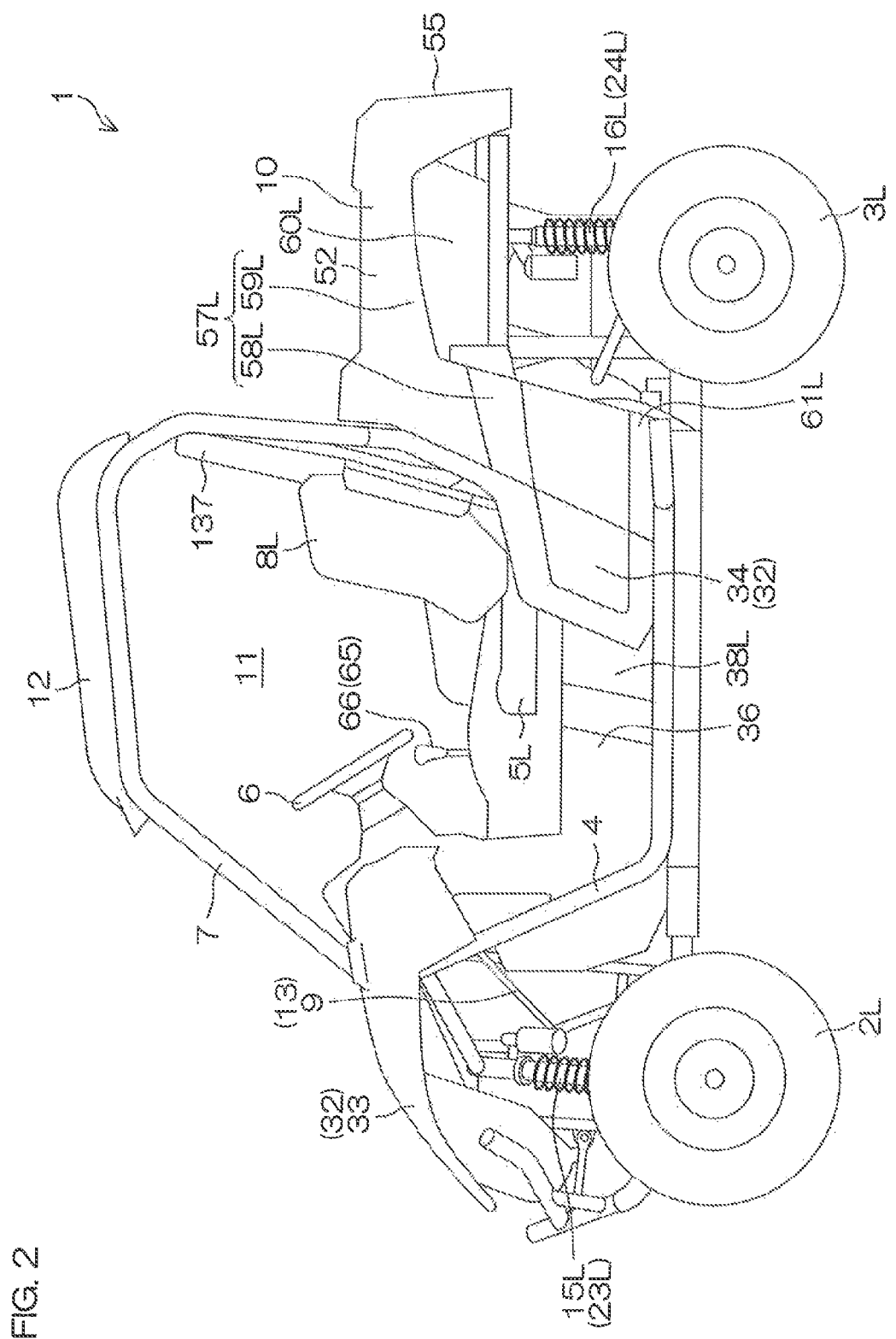
FIG. 2 is a left side view of the vehicle.
Figure 3:
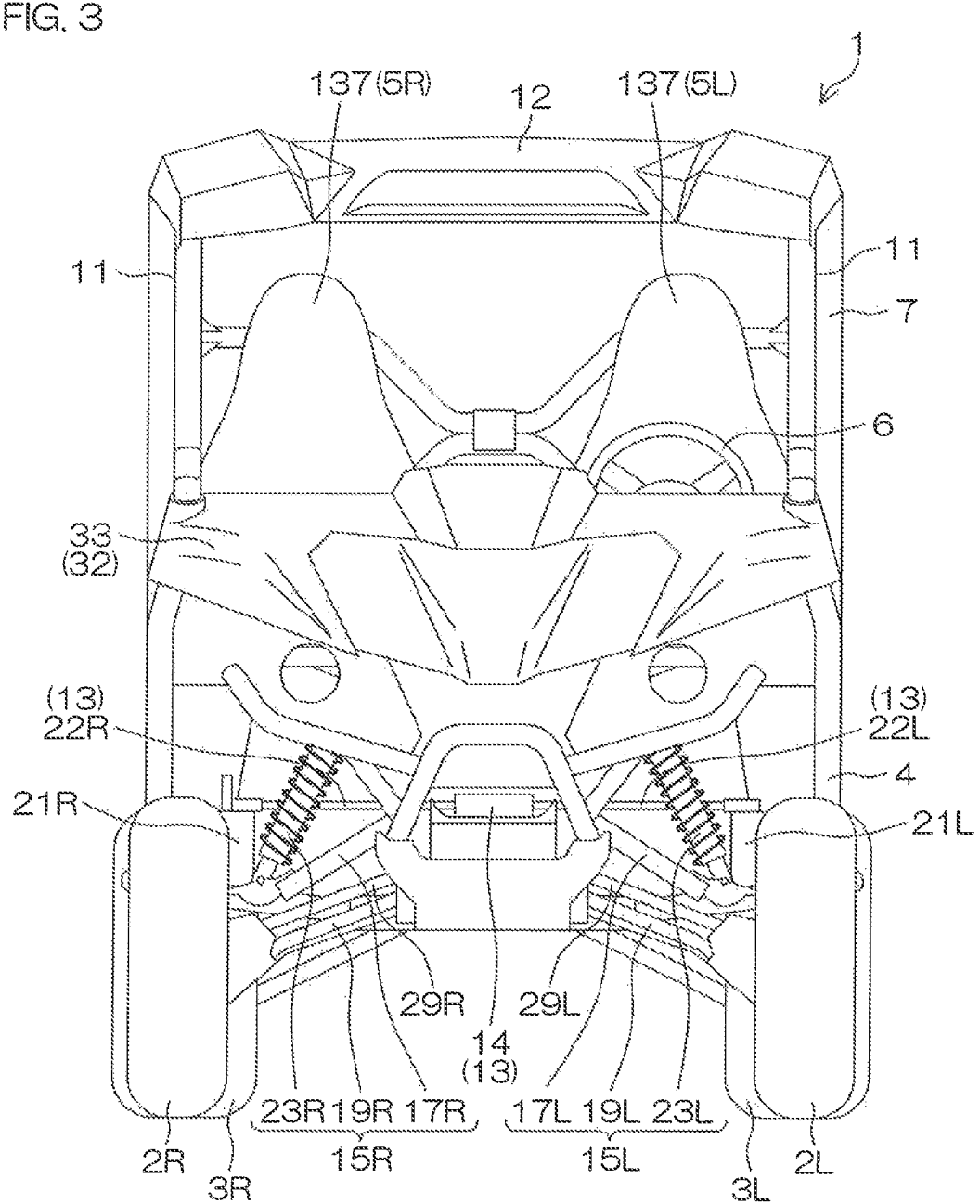
FIG. 3 is a front view of the vehicle.
Figure 4:
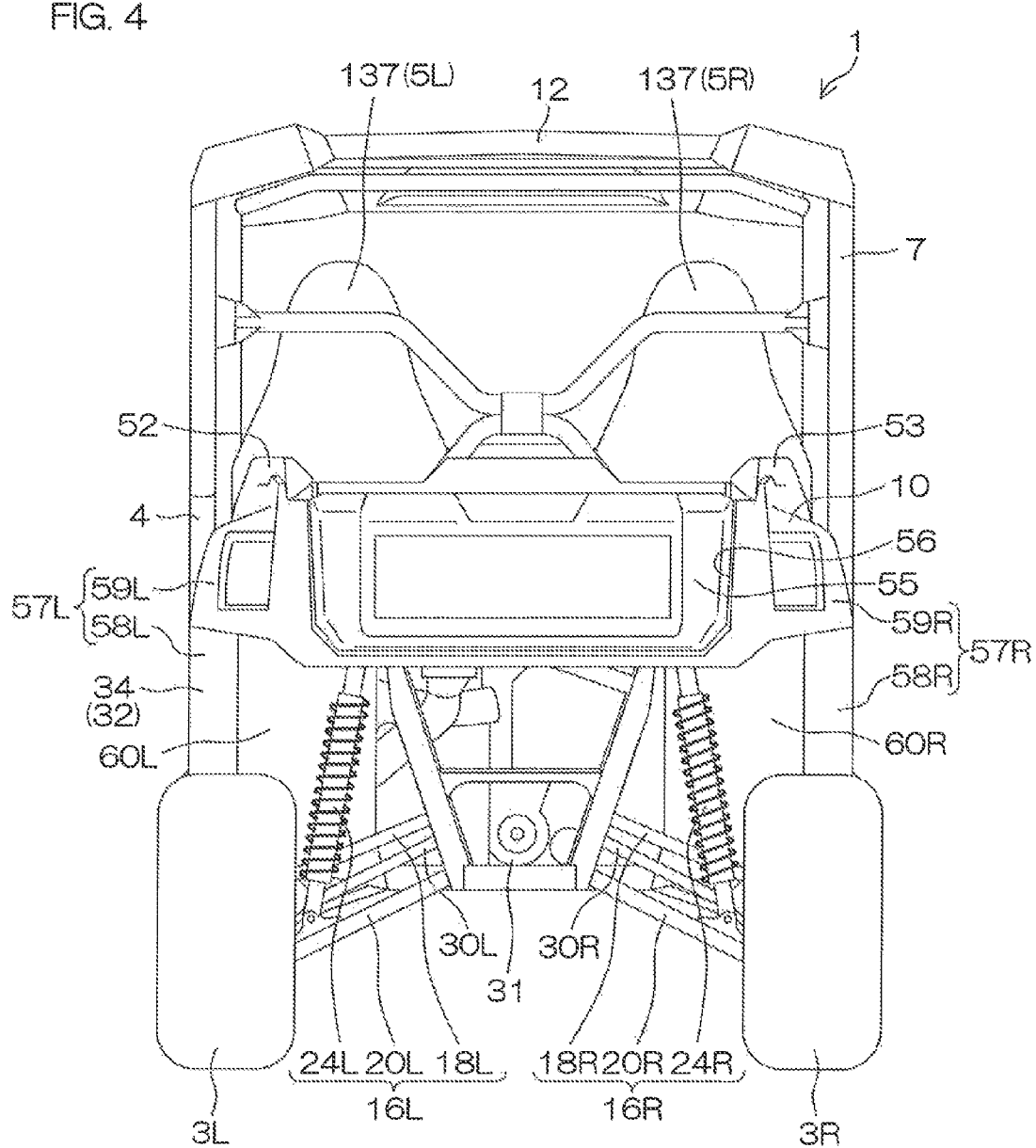
FIG. 4 is a back view of the vehicle.
Figure 5:
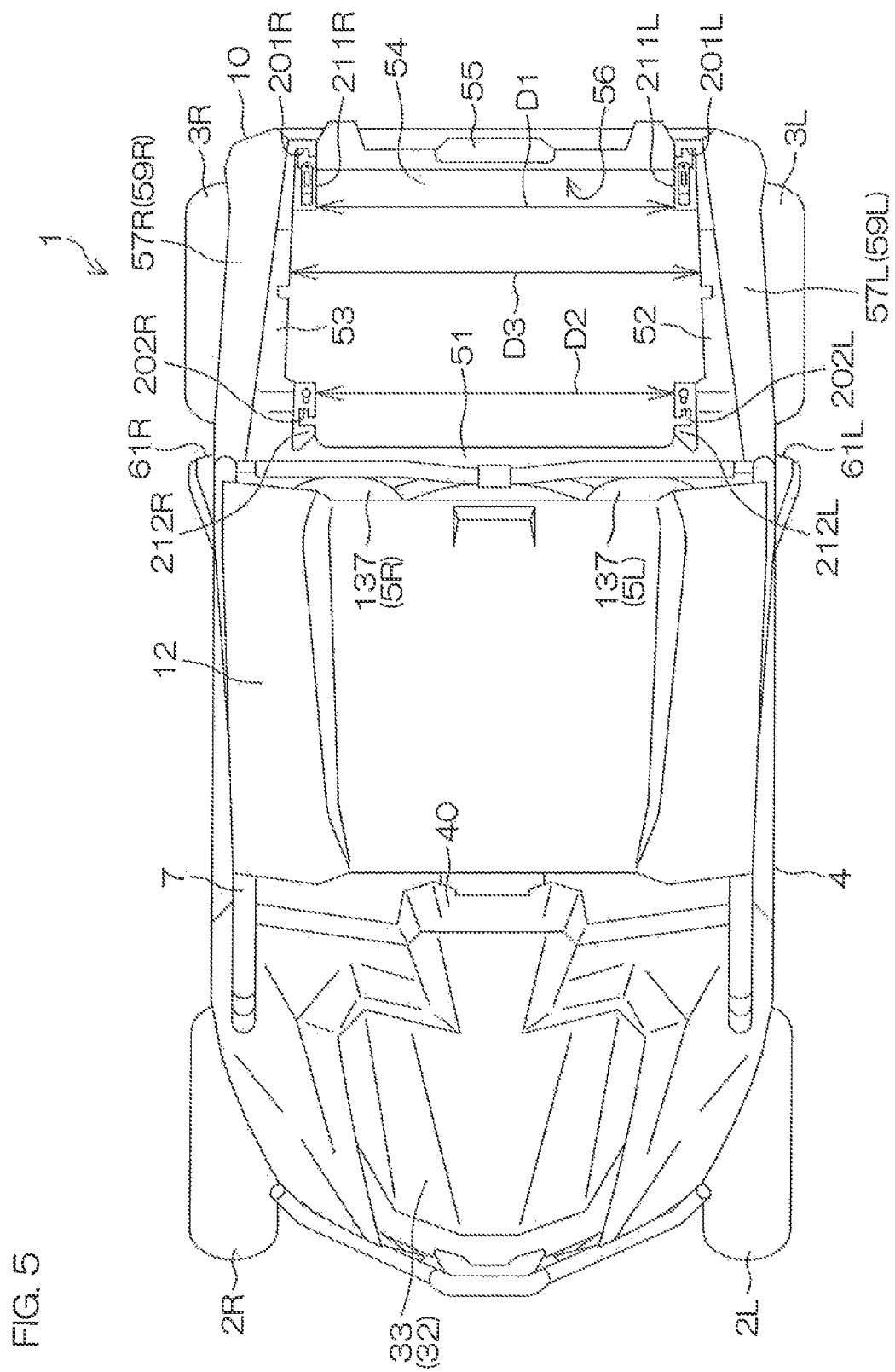
FIG. 5 is a plan view of the vehicle.
Figure 6:
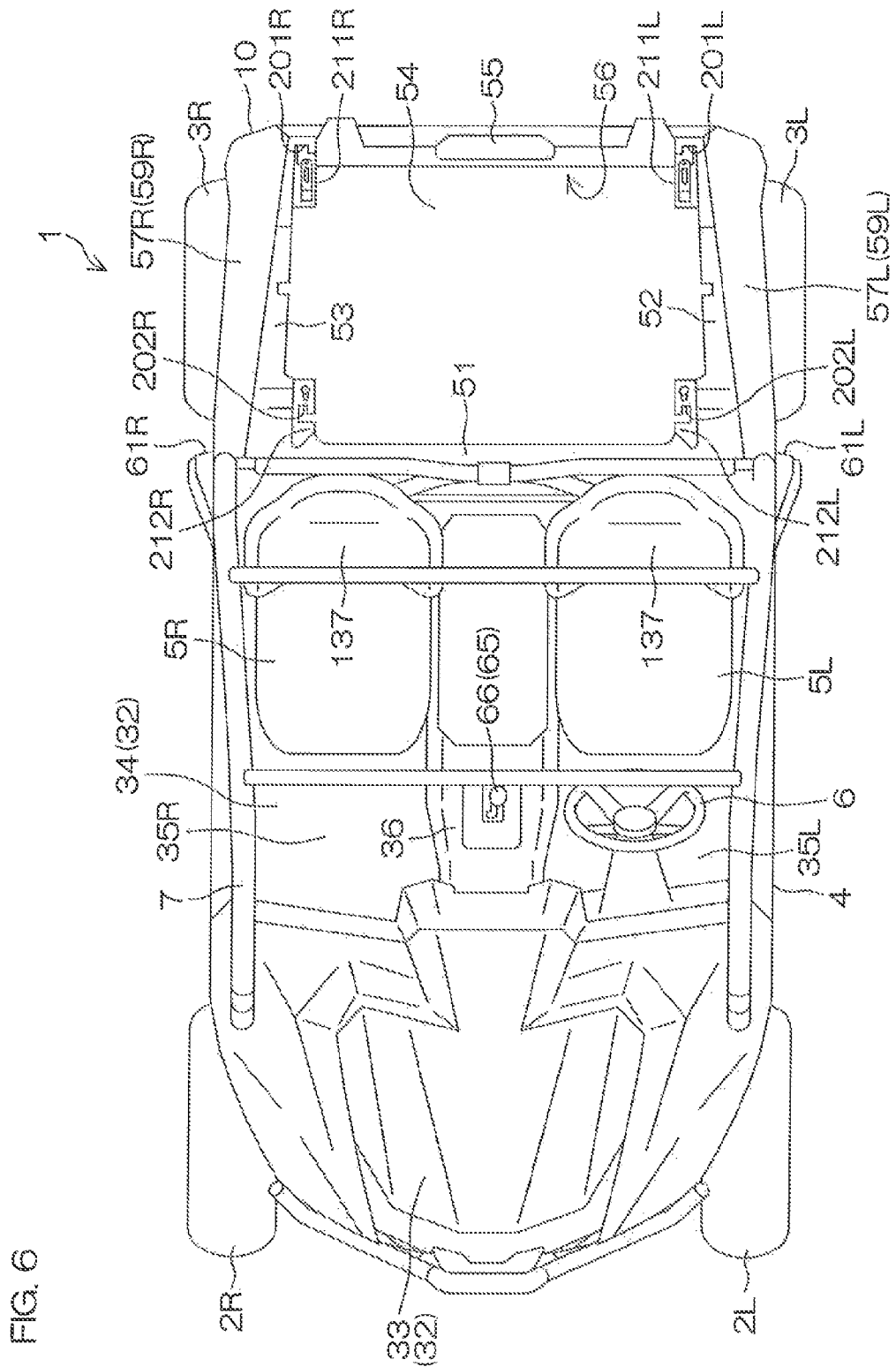
FIG. 6 is a plan view of the vehicle in a state where a roof is removed.

FIG. 1 is a perspective view of a vehicle according to a preferred embodiment of the present invention. FIG. 2 is a left side view of the vehicle, FIG. 3 is a front view thereof, FIG. 4 is a back view thereof, and FIG. 5 is a plan view thereof. FIG. 6 is a plan view of the vehicle in a state where a roof is removed.

A vehicle 1 of the present preferred embodiment belongs to a category of utility vehicles. More specifically, the vehicle 1 preferably is a four-wheel recreational off road vehicle, for example. The vehicle 1 includes a left front wheel 2L and a right front wheel 2R, a left rear wheel 3L and a right rear wheel 3R, a frame 4, seat units 5L and 5R, a steering wheel 6, a roll cage 7, bolsters 8L and 8R, and a cargo bed 10. The left front wheel 2L and the right front wheel 2R are arranged to the left and right, respectively. The left rear wheel 3L and the right rear wheel 3R are arranged rearward of the left front wheel 2L and the right front wheel 2R, respectively, and arranged to the left and right, respectively. The wheels 2L, 2R, 3L, and 3R each include a tire. The surface of the tire may be roughened in a block pattern to be suitable for running on an uneven ground.

The frame 4 is supported by the pair of front wheels 2L and 2R, and the pair of rear wheels 3L and 3R. The frame 4 supports the seat units 5L and 5R between the pair of front wheels 2L, 2R and the pair of rear wheels 3L, 3R. The steering wheel 6 is arranged forward of the seat units 5L and 5R. In the present preferred embodiment, the seat units 5L and 5R include the left seat unit 5L and the right seat unit 5R arranged to the left and right. One seat unit, which is the left seat unit 5L in the present preferred embodiment, is a driver's seat where a driver is seated to face forward. The steering wheel 6 is arranged forward of the left seat unit 5L. The steering wheel 6 is coupled to a steering shaft 9. The steering shaft 9 is mounted on the frame 4 such that the steering shaft 9 is rotatable around an axis thereof.

At a left side of the left seat unit 5L and at a right side of the right seat unit 5R, a left bolster 8L and a right bolster 8R are provided, respectively. The left bolster 8L is a plate-shaped member facing from the left side to a passenger (driver) seated on the left seat unit 5L. The left bolster 8L supports the passenger on the left seat unit 5L from the left side. The right bolster 8R is a plate-shaped member facing from the right side to the passenger seated on the right seat unit 5R. The right bolster 8R supports the passenger on the right seat unit 5R from the right side. The bolsters 8L and 8R are preferably made from a resin material, for example.

The roll cage 7 is attached to the frame 4. The roll cage 7 surrounds the seat units 5L and 5R, and defines openings 11, on left and right, respectively, through which the passenger gets in and out of the vehicle 1. Above the roll cage 7, a roof 12 is attached.

The cargo bed 10 is arranged rearward of the seat units 5L and 5R. The cargo bed 10 is supported by the frame 4.

The vehicle 1 is further provided with left-front and right-front suspension assemblies 15L and 15R that suspend each of the pair of front wheels 2L and 2R, and left-rear and right-rear suspension assemblies 16L and 16R that suspend each of the pair of rear wheels 3L and 3R. The frame 4 is supported, via the suspension assemblies 15L, 15R, 16L, and 16R, by the pair of front wheels 2L and 2R and the pair of rear wheels 3L and 3R.

In the present preferred embodiment, the suspension assemblies 15L, 15R, 16L, and 16R are each preferably of the double wishbone type, for example.

Specifically, the front suspension assemblies 15L and 15R each include upper arms 17L and 17R and lower arms 19L and 19R arranged on the top and bottom. Outer ends of the upper arms 17L and 17R and the lower arms 19L and 19R are coupled to knuckle arms 21L and 21R of the corresponding front wheels 2L and 2R, respectively. Inner ends of the upper arms 17L and 17R and the lower arms 19L and 19R are coupled pivotably to the frame 4. Near the outer ends of the upper arms 17L and 17R, lower ends of shock absorbers 23L and 23R are each coupled. Upper ends of the shock absorbers 23L and 23R are coupled to the frame 4.

Each of the rear suspension assemblies 16L and 16R includes upper arms 18L and 18R and lower arms 20L and 20R arranged on the top and bottom. Outer ends of the upper arms 18L and 18R and the lower arms 20L and 20R are each coupled to knuckle arms (not shown) of the corresponding rear wheels 3L and 3R. Inner ends of the upper arms 18L and 18R and the lower arms 20L and 20R are coupled pivotably to the frame 4. Near the outer ends of the lower arms 20L and 20R, lower ends of shock absorbers 24L and 24R are each coupled. Upper ends of the shock absorbers 24L and 24R are coupled to the frame 4.

Although not shown in the figure, axles of the wheels 2L, 2R, 3L, and 3R are supported rotatably by the corresponding knuckle arms. To these axles, corresponding drive shafts 29L, 29R, 30L, and 30R are coupled, respectively, via a constant-velocity universal joint (not shown). Power from an engine 31, which is a drive source, is transmitted to the drive shafts 29L, 29R, 30L, and 30R. The engine 31 is arranged between the seat units 5L and 5R and supported by the frame 4.

Further, the vehicle 1 includes a body panel 32 attached to the frame 4. In the present preferred embodiment, the body panel 32 is preferably made from a resin material. The body panel 32 includes a front cover 33 that covers a front portion of the vehicle 1 and a mid cover 34 that covers a central portion of the vehicle 1. The cargo bed 10 is arranged rearward of the mid cover 34. The front cover 33 covers the front suspension assemblies 15L and 15R. Further, the front cover 33 covers a steering mechanism 13 coupled to the steering wheel 6. The steering mechanism 13 includes the steering shaft 9 coupled to the steering wheel 6. Further, the steering mechanism 13 may include a rack and pinion mechanism 14 that converts the rotation of the steering shaft 9 into a linear motion in the left-right direction of the vehicle 1, and a pair of tie rods 22L and 22R. The pair of tie rods 22L and 22R each couple both ends of a rack shaft of the rack and pinion mechanism 14 and the knuckle arms 21L and 21R.

Figure 7:
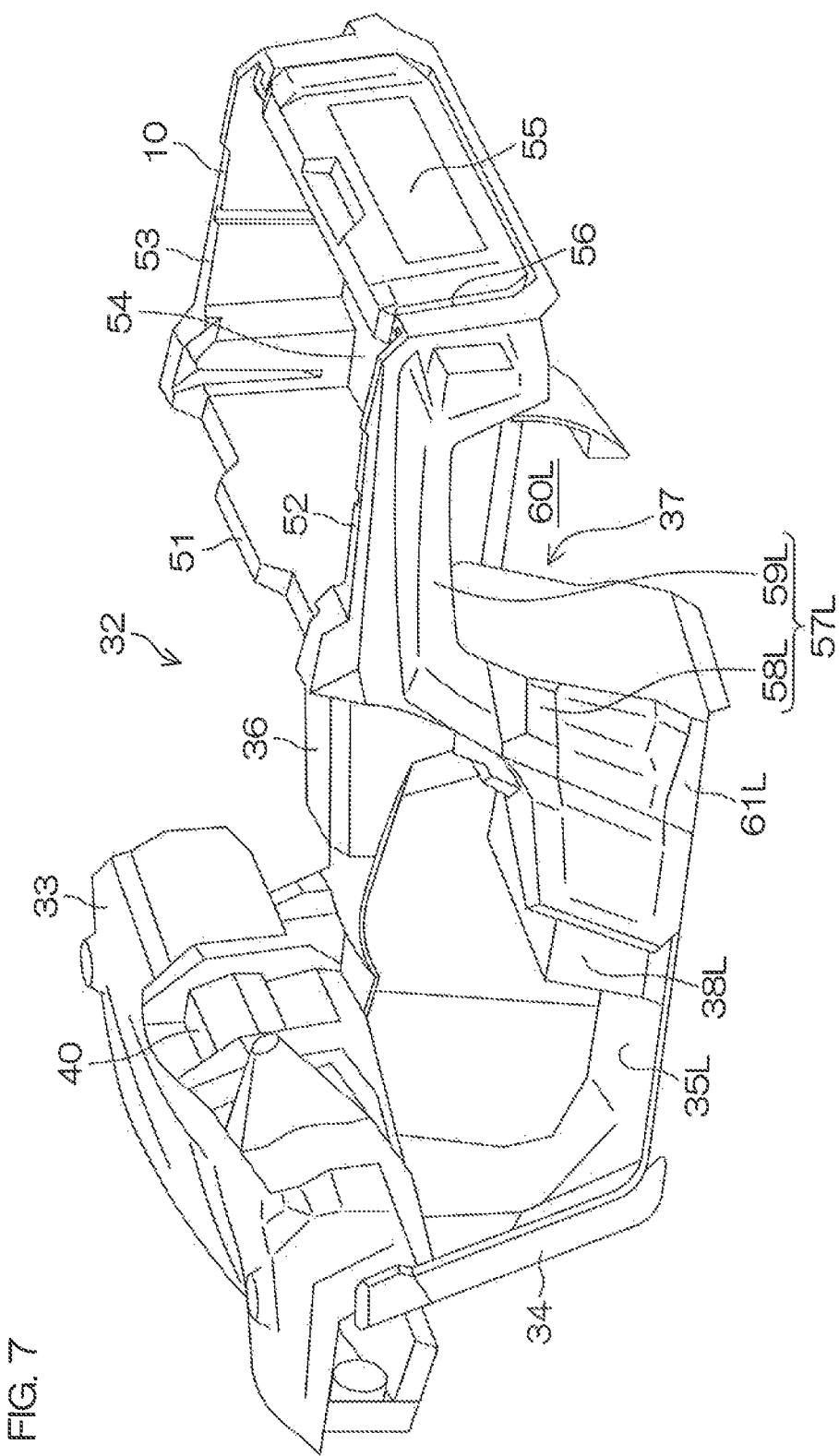
FIG. 7 is a perspective view of a body panel provided in the vehicle.

FIG. 7 is a perspective view of the body panel 32. The front portion of the mid cover 34 is coupled to the front cover 33. Further, the rear portion of the mid cover 34 is coupled to the cargo bed 10. The mid cover 34 includes a left floor portion 35L and a right floor portion 35R (see FIG. 6) forward of the left seat unit 5L and the right seat unit 5R, respectively. Between the left floor portion 35L and the right floor portion 35R, an elevated portion 36 elevated upward is arranged to extend in the front-back direction. Below the elevated portion 36, a tunnel space 37 (see FIG. 9 as well) is defined which penetrates in the front-back direction. The tunnel space 37 houses a drive force transmitting mechanism 69 used to transmit the drive force of the engine 31 to the four wheels 2L, 2R, 3L, and 3R (see FIG. 9).

Rearward of the left floor portion 35L and the right floor portion 35R, raised portions 38L and 38R (see FIG. 9 as well) covering the lower spaces of the left seat unit 5L and the right seat unit 5R from the front and the lateral side are provided, respectively. An instrument support portion 40 is arranged forward of the left floor portion 35L and the right floor portion 35R. The instrument support portion 40 is raised upward. Instruments (not shown) are held on the instrument support portion 40.

In the present preferred embodiment, the cargo bed 10 is preferably made from a resin material. The cargo bed 10 includes a front wall portion 51, a left-side wall portion 52, a right-side wall portion 53, a bottom wall portion 54, and a tail gate 55. The front wall portion 51 is raised upward at the back of the seat units 5L and 5R, and extends in the left-right direction. The left-side wall portion 52 is integrally coupled to a left side edge of the front wall portion 51, raised upward, and extends from the left side edge of the front wall portion 51 to the rear side. The right-side wall portion 53 is integrally coupled to a right side edge of the front wall portion 51, raised upward, and extends from the right side edge of the front wall portion 51 to the rear side. The left-side wall portion 52 and the right-side wall portion 53 face each other in the left-right direction, and each includes a parallel or substantially parallel inner wall surface. The bottom wall portion 54 is integrally coupled to a lower edge of the front wall portion 51, and extends from the lower edge of the front wall portion 51 toward the rear along or substantially along the horizontal surface. The bottom wall portion 54 preferably has a rectangular or substantially rectangular shape, and the left side edge is integrally coupled to the lower edge of the left-side wall portion 52 and the right side edge is integrally coupled to the lower edge of the right-side wall portion 53. A rear opening 56 is provided between the rear end of the left-side wall portion 52 and the rear end of the right-side wall portion 53. The tail gate 55 is attached removably between the rear end of the left-side wall portion 52 and the rear end of the right-side wall portion 53 so as to close the rear opening 56.

The body panel 32 includes a left rear wheel fender 57L that covers the left rear wheel 3L, and a right rear wheel fender 57R that covers the right rear wheel 3R (see FIG. 4, FIG. 5, etc.).

The left rear wheel fender 57L includes a first left fender portion 58L provided at a rear left side of the mid cover 34 and a second left fender portion 59L provided at a left side of the cargo bed 10. The first left fender portion 58L and the second left fender portion 59L are coupled to define a left-rear-wheel house 60L that covers the left rear wheel 3L.

The first left fender portion 58L includes a left protruded fender portion 61L at a lower end. The left protruded fender portion 61L is positioned forward of the left rear wheel 3L, and protrudes toward a left side or the outside of the vehicle 1. The left protruded fender portion 61L is preferably positioned at a height within the width, in the up-down direction, of the left rear wheel 3L, in a state where the vehicle 1 is motionless on the horizontal surface as shown in FIG. 2, FIG. 14A, etc. In other words, the left protruded fender portion 61L is preferably positioned at a height higher than the lower end of the left rear wheel 3L and lower than the upper end thereof. More specifically, the left protruded fender portion 61L is preferably positioned at a height higher than the rotation center 145L of the left rear wheel 3L and lower than the upper end thereof.

The second left fender portion 59L bulges outward (to a left side) from a position lower than the upper edge of the left-side wall portion 52 of the cargo bed 10. The second left fender portion 59L is positioned above the left rear wheel 3L, as viewed from the back (see FIG. 4), and covers the left rear wheel 3L from above. The inner edge of the second left fender portion 59L is integrally coupled to the left-side wall portion 52 of the cargo bed 10, and as viewed from the back, is positioned outside (at a left side) of an innermost end 141L of the left rear wheel 3L. The outer edge of the second left fender portion 59L is positioned, as viewed from the back, inside of an outermost end 142L of the left rear wheel 3L. An outermost end 152L (see FIG. 14A) of the left protruded fender portion 61L is positioned outside (at a left side) of the second left fender portion 59L.

Similarly, as presented in FIG. 4, the right rear wheel fender 57R includes a first right fender portion 58R defined at a rear right side of the mid cover 34 and a second right fender portion 59R defined at a right side of the cargo bed 10. The first right fender portion 58R and the second right fender portion 59R are coupled to define a right-rear wheel house 60R covering the right rear wheel 3R.

The first right fender portion 58R includes a right protruded fender portion 61R (see FIG. 14B) at a lower end. The right protruded fender portion 61R is positioned forward of the right rear wheel 3R, and protrudes toward a right side or the outside of the vehicle 1. The right protruded fender portion 61R is preferably positioned at a height within the width, in the up-down direction, of the right rear wheel 3R, in a state where the vehicle 1 is motionless on the horizontal surface as shown in FIG. 14B. In other words, the right protruded fender portion 61R is preferably positioned at a height higher than the lower end of the right rear wheel 3R and lower than the upper end thereof. More specifically, the right protruded fender portion 61R is preferably positioned at a height higher than the rotation center 145R of the right rear wheel 3R and lower than the upper end thereof.

The second right fender portion 59R bulges outward (to the right side) from a position lower than the upper edge of the right-side wall portion 53 of the cargo bed 10. The second right fender portion 59R is positioned above the right rear wheel 3R, as viewed from the back (see FIG. 4), and covers the right rear wheel 3R from above. The inner edge of the second right fender portion 59R is integrally coupled to the right-side wall portion 53 of the cargo bed 10, and as viewed from the back, is positioned outside (at the right side) of an innermost end 141R of the right rear wheel 3R. The outer edge of the second right fender portion 59R is positioned, as viewed from the back, inside of an outermost end 142R of the right rear wheel 3R. An outermost end 152R (see FIG. 14B) of the right protruded fender portion 61R is positioned outside (at a left side) of the second right fender portion 59R.

Figure 8:
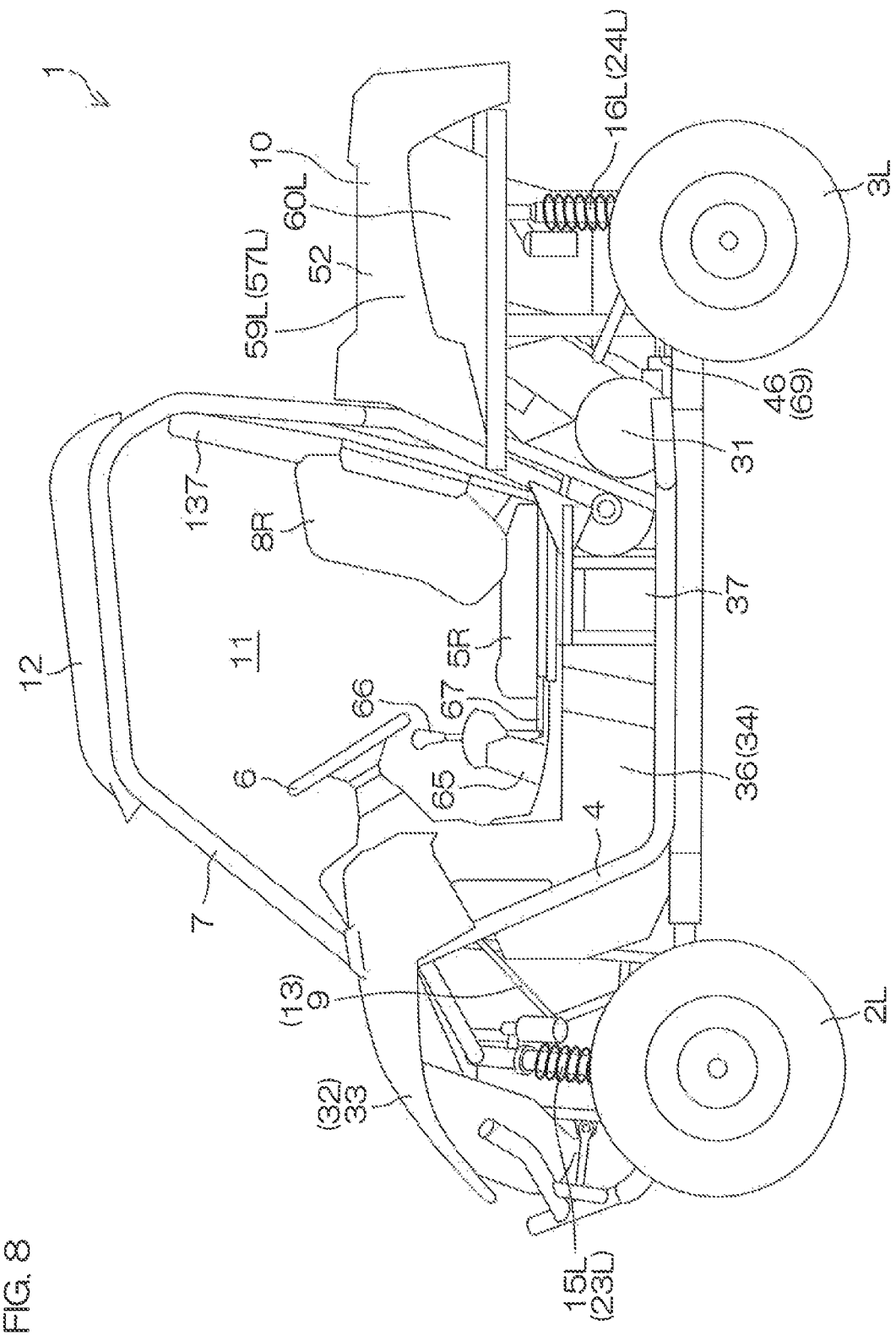
FIG. 8 is a side view showing an arrangement of an engine with a portion of the body panel removed.
Figure 9:
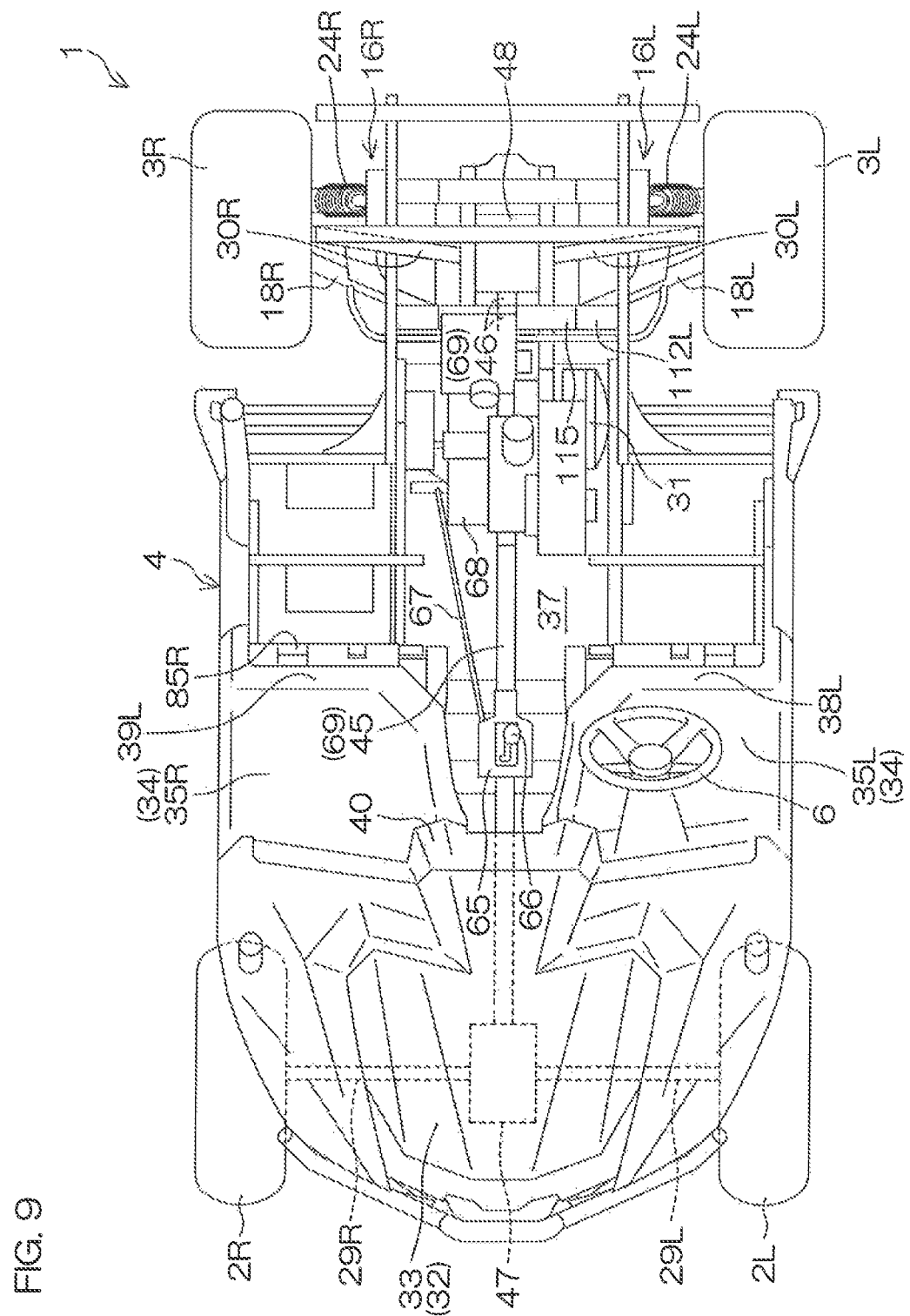
FIG. 9 is a plan view showing an arrangement of an engine with a roof, a cargo bed, etc., removed.

FIG. 8 is a side view showing an arrangement of an engine 31 with a portion of the mid cover 34 removed. FIG. 9 is a plan view showing an arrangement of the engine 31 with the roof 12, a portion of the mid cover 34, and the cargo bed 10 removed.

The engine 31 is arranged forward of the rear suspension assemblies 16L and 16R, and is arranged at the center or substantially the center of the width of the vehicle 1 in the left-right direction. In the left-right direction, the engine 31 is arranged between the left seat unit 5L and the right seat unit 5R. The center of gravity of the engine 31 is located in line or substantially in line with backrests 137 of the left seat unit 5L and the right seat unit 5R. A transmission lever unit 65 is arranged between the left and right floor portions 35L and 35R.

The transmission lever unit 65 includes a transmission lever 66 arranged to be operated by a driver. One end (front end) of an operation rod 67 is coupled to the transmission lever 66. The other end (rear end) of the operation rod 67 is coupled to a transmission unit 68 attached to the engine 31. The transmission unit 68 changes an output rotation speed of the engine 31 with a gear ratio of a gear stage selected from a plurality of gear stages. The rotation changed in speed is transmitted to the drive shafts 29L, 29R, 30L, and 30R via the drive force transmitting mechanism 69.

The drive force transmitting mechanism 69 includes a front propeller shaft 45, a rear propeller shaft 46, a front differential device 47, and a rear differential device 48. The front propeller shaft 45 and the rear propeller shaft 46 are output shafts of the transmission unit 68, and transmit the torque of the engine 31. The front propeller shaft 45 extends forward from the transmission unit 68, and the front differential device 47 is coupled to a front end of the front propeller shaft 45. The front differential device 47 transmits the torque from the front propeller shaft 45 to drive shafts 29L and 29R while permitting a rotation difference between the drive shafts 29L and 29R. The rear propeller shaft 46 extends rearward from the transmission unit 68, and the rear differential device 48 is coupled to a rear end of the rear propeller shaft 46. The rear differential device 48 transmits the torque from the rear propeller shaft 46 to drive shafts 30L and 30R while permitting a rotation difference between the drive shafts 30L and 30R.

Figure 10A:
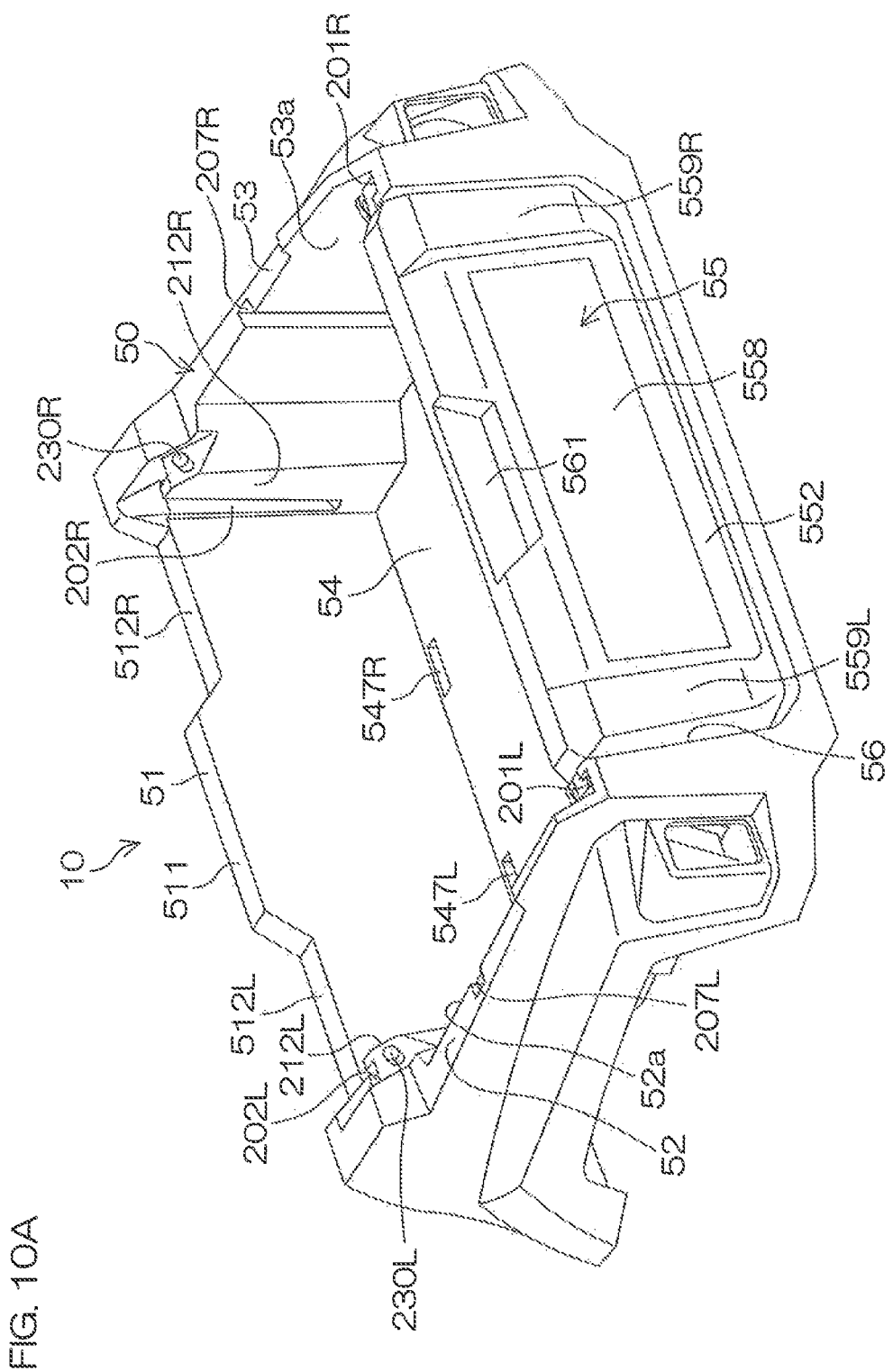
FIG. 10A is a perspective view of a cargo bed as viewed from a diagonal rear side.
Figure 10B:
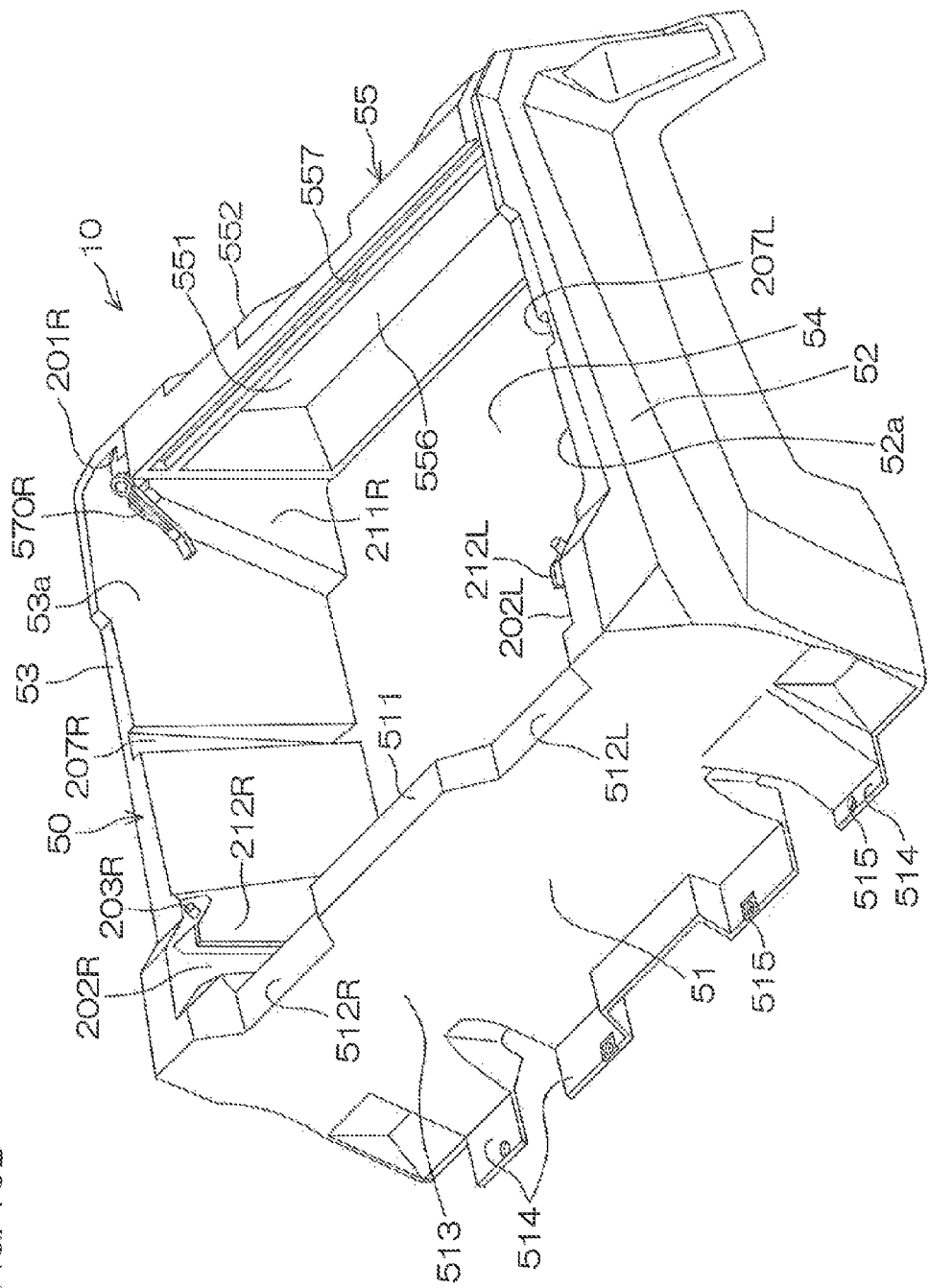
FIG. 10B is a perspective view of the cargo bed as viewed from a diagonal front side.

FIG. 10A is a perspective view of the cargo bed 10 as viewed from a diagonal rear side, and FIG. 10B is a perspective view of the cargo bed 10 as viewed from a diagonal front side. The cargo bed 10 includes a bed portion 50 and a tail gate 55. The bed portion 50 is preferably a resin molded product, for example. The tail gate 55 is preferably a resin molded product, for example. The bed portion 50 includes a left-side wall portion 52 and right-side wall portion 53. A rear opening 56 is provided between the left-side wall portion 52 and the right-side wall portion 53.

The left-side wall portion 52 and the right-side wall portion 53 extend in the up-down direction and the front-back direction. The front end of each of the left-side wall portion 52 and the right-side wall portion 53 is coupled to the ends of the front wall portion 51. The front wall portion 51 extends in the up-down direction and the left-right direction. To a lower edge of each of the front wall portion 51, the left-side wall portion 52, and the right-side wall portion 53, a bottom wall portion 54 is coupled. The bottom wall portion 54 extends in the front-back direction and the left-right direction. The rear opening 56 of the bed portion 50 is defined by the left-side wall portion 52, the right-side wall portion 53, and the bottom wall portion 54. The tail gate 55 is arranged so as to close the rear opening 56.

The left-side wall portion 52 and the right-side wall portion 53 each include inner wall surfaces 52a and 53a arranged parallel or substantially parallel to each other in a vertical direction. At the rear ends of the inner wall surfaces 52a and 53a of the left-side wall portion 52 and the right-side wall portion 53, a first left groove portion 201L and a first right groove portion 201R (hereinafter, may be referred to as "first groove portions 201L and 201R") are provided, respectively. The first left groove portion 201L and the first right groove portion 201R each extend in the up-down direction, and face each other in the left-right direction. The first left groove portion 201L and the first right groove portion 201R are arranged so that each of a left end and a right end of the tail gate 55 is configured to be slidably inserted in the up-down direction. As a result, the first left groove portion 201L and the first right groove portion 201R are arranged so that the tail gate 55 is held removably at a rearward position (first position) to close the rear opening 56.

Forward with respect to the first left groove portion 201L and the first right groove portion 201R, a second left groove portion 202L and a second right groove portion 202R (hereinafter, may be referred to as "second right groove portions 202L and 202R") are provided, respectively, on inner wall surfaces 52a and 53a of the left-side wall portion 52 and the right-side wall portion 53. In the present preferred embodiment, the second left groove portion 202L and the second right groove portion 202R are provided, respectively, at the front ends of the inner wall surfaces 52a and 53a of the left-side wall portion 52 and the right-side wall portion 53. The second left groove portion 202L and the second right groove portion 202R each extend in the up-down direction, and face each other in the left-right direction. The second left groove portion 202L and the second right groove portion 202R are arranged so that each of the left end and the right end of the tail gate 55 is configured to be slidably inserted in the up-down direction. As a result, the second left groove portion 202L and the second right groove portion 202R are arranged so that the tail gate 55 is held removably at a frontward position (second position) forward with respect to the rearward position.

A first left protruded portion 211L and a first right protruded portion 211R (see FIG. 5 and FIG. 6) that protrude inward of the bed portion 50 are each provided at the rear ends of the left-side wall portion 52 and the right-side wall portion 53. The first left protruded portion 211L protrudes from the rear end of the left-side wall portion 52 toward a right side. The first right protruded portion 211R protrudes from the rear end of the right-side wall portion 53 toward a left side. The first left protruded portion 211L and the first right protruded portion 211R face each other in the left-right direction. The first left groove portion 201L is provided in the first left protruded portion 211L. The first right groove portion 201R is provided in the first right protruded portion 211R.

At a position forward with respect to the first left protruded portion 211L, that is, in the present preferred embodiment, at the front end of the left-side wall portion 52, a second left protruded portion 212L protruding from the left-side wall portion 52 toward an inner side (right side) is provided. At a position forward with respect to the first right protruded portion 211R, that is, in the present preferred embodiment, at the front end of the right-side wall portion 53, a second right protruded portion 212R protruding from the right-side wall portion 53 toward an inner side (left side) is provided. The second left protruded portion 212L and the second right protruded portion 212R face each other in the left-right direction. The second left groove portion 202L is provided in the second left protruded portion 212L. The second right groove portion 202R is provided in the second right protruded portion 212R.

As shown in FIG. 5, a distance between the left-side wall portion 52 and the right-side wall portion 53 at a position of the first left and right protruded portions 211L and 211R is a distance D1. A distance between the side wall portions 52 and 53 at a position of the second left and right protruded portions 212L and 212R is a distance D2. A distance between the side wall portions 52 and 53 at a position between the first protruded portions 211L, 211R and the second protruded portions 212L, 212R is a distance D3. The distances D1 and D2 are preferably approximately equal. The distance D3 is longer than either of the distances D1 and D2.

In order to partition a cargo accommodation space in the front-back direction, partition-plate grooves 207L and 207R are each located at an intermediate portion, in the front-back direction, of the left-side and right-side wall portions 52 and 53. More specifically, between the first protruded portions 211L, 211R and the second protruded portions 212L, 212R, the partition-plate grooves 207L and 207R are arranged. The grooves 207L and 207R extend in the up-down direction, face each other in the left-right direction, and are parallel or substantially parallel to each other. The partition-plate grooves 207L and 207R are indented from the inner wall surfaces 52a and 53a of the side wall portions 52 and 53 so as not to decrease the cargo accommodation space. Therefore, a partition plate (not shown) to be inserted into the grooves 207L and 207R has a width, in the left-right direction, longer than the distance D3 between the left-side and right-side wall portions 52 and 53.

Figure 11A:
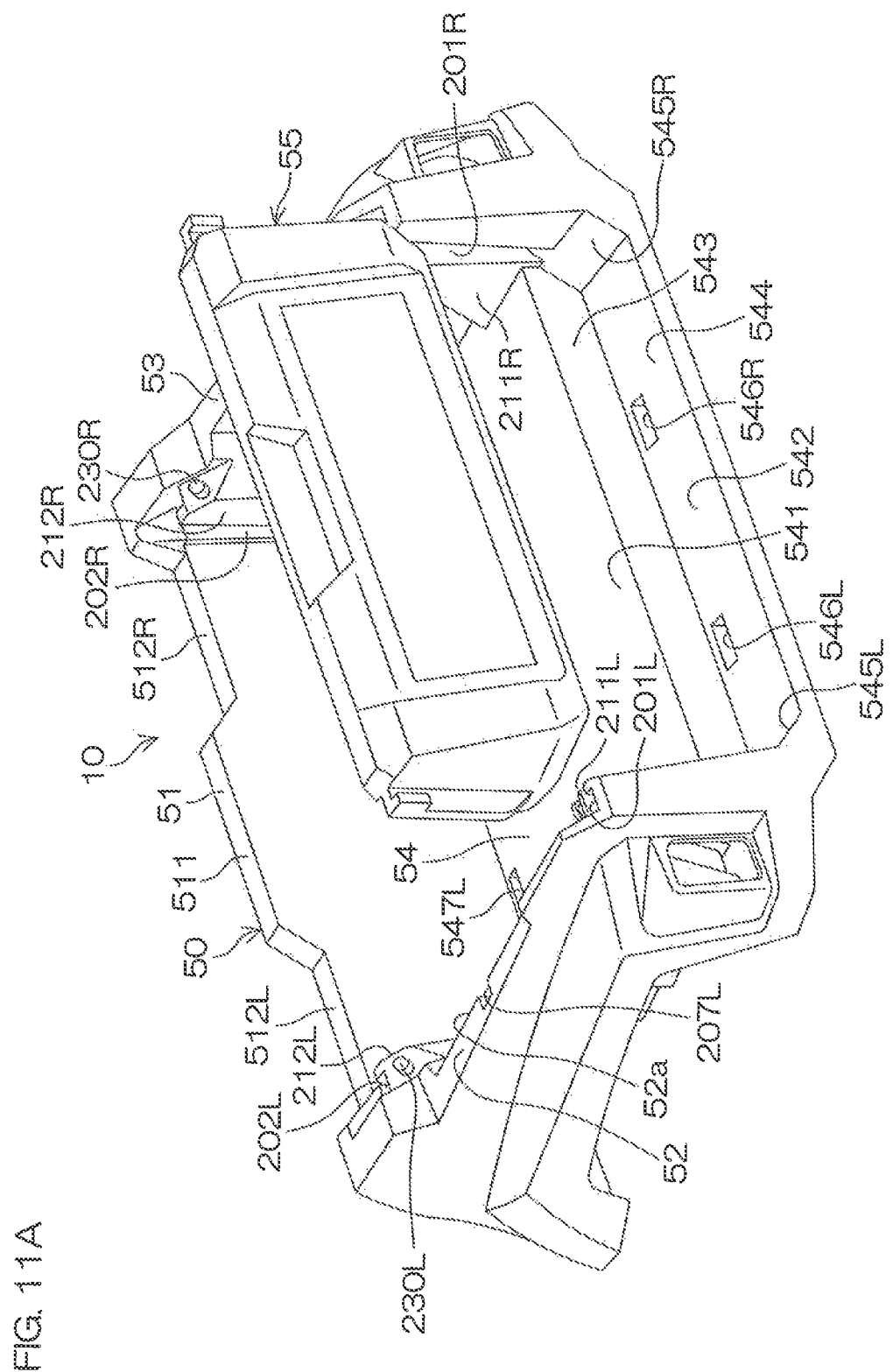
FIG. 11A is a perspective view of a cargo bed in a state where a tail gate is removed.
Figure 11B:
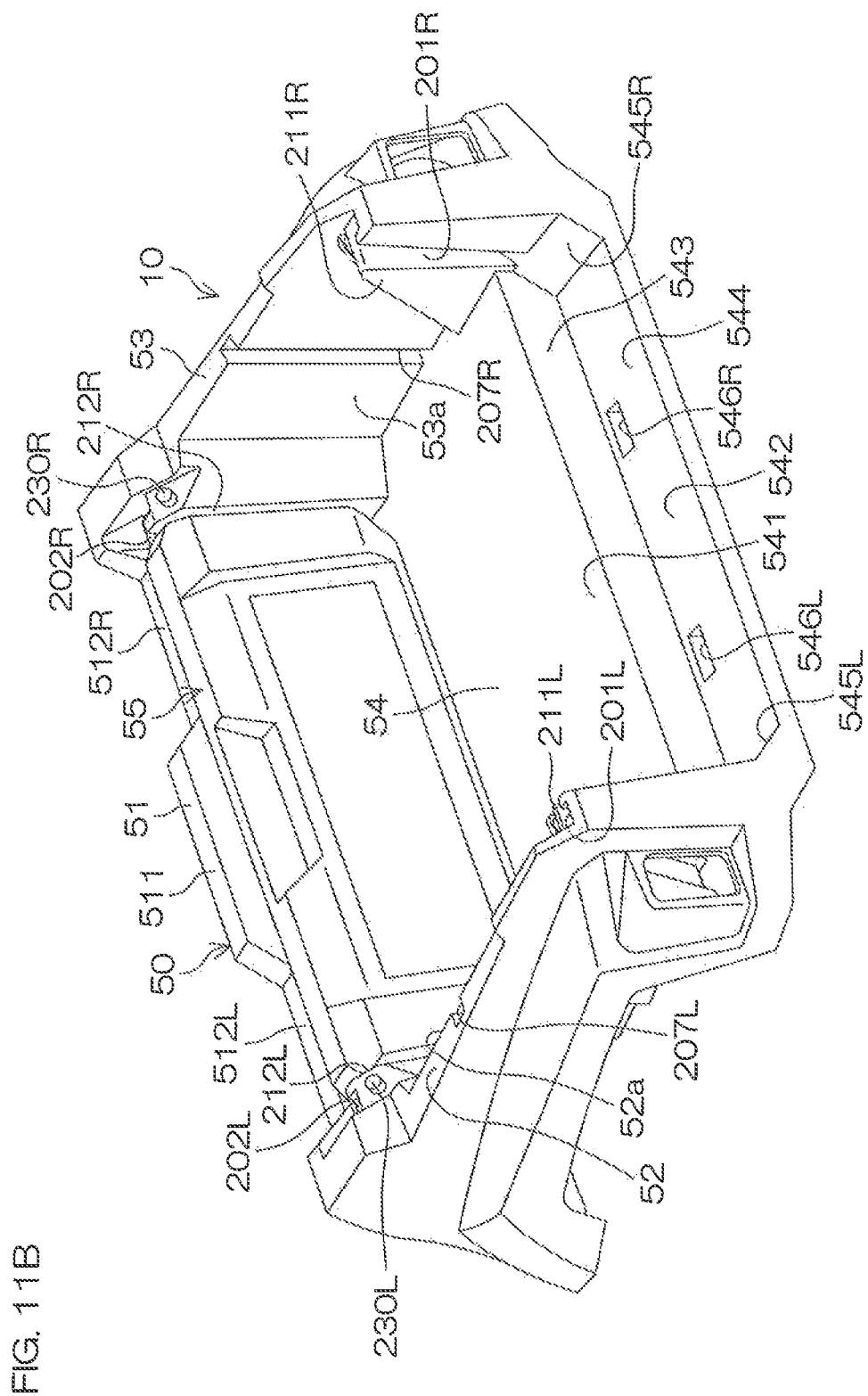
FIG. 11B is a perspective view of the cargo bed in a state where the tail gate is held at a front position.

FIG. 11A is a perspective view of the cargo bed 10 in a state where the tail gate 55 is removed, and FIG. 11B is a perspective view of the cargo bed 10 in a state where the tail gate 55 is held at the frontward position. A user can remove the tail gate 55 attached to the first groove portions 201L and 201R by lifting the tail gate 55 and sliding it upward (see FIG. 11A). The user can attach the tail gate 55 to the second groove portions 202L and 202R by moving the removed tail gate 55 forward. The user slides the tail gate 55 downward by aligning the both ends of the tail gate 55 to the second groove portions 202L and 202R. As a result, the tail gate 55 is attached to the second groove portions 202L and 202R.

The bottom wall portion 54 of the bed portion 50 includes a step portion 543 at the rear end thereof. More particularly, a floor surface of the bottom wall portion 54 includes a cargo receiving surface 541 extending from the front end to a vicinity of the rear end and a tail gate receiving surface 542 extending in a band shape in the left-right direction at the rear end. The cargo receiving surface 541 receives a cargo loaded in the cargo accommodation space. The tail gate receiving surface 542 is arranged at a lower position than that of the cargo receiving surface 541, and as a result, the step portion 543 is located between the receiving surfaces 541 and 542. The tail gate receiving surface 542 has a shape matching that of the bottom surface 555 (see FIG. 13) of the tail gate 55. Specifically, the tail gate receiving surface 542 includes a horizontal surface portion 544 extending in the left-right direction, and a pair of inclined surface portions 545L and 545R inclined outward and upward from the both ends of the horizontal surface portion 544. The pair of inclined surface portions 545L and 545R communicate with lower ends of the first left groove portion 201L and the first right groove portion 201R, respectively.

When the tail gate 55 is attached to the first groove portions 201L and 201R, the bottom surface 555 of the tail gate 55 contacts the tail gate receiving surface 542. Therefore, the lower edge of the inner surface 551 of the tail gate 55 faces the step portion 543. Thus, as viewed from the back, the tail gate 55 completely covers the cargo receiving surface 541 of the bottom wall portion 54.

Figure 12A:
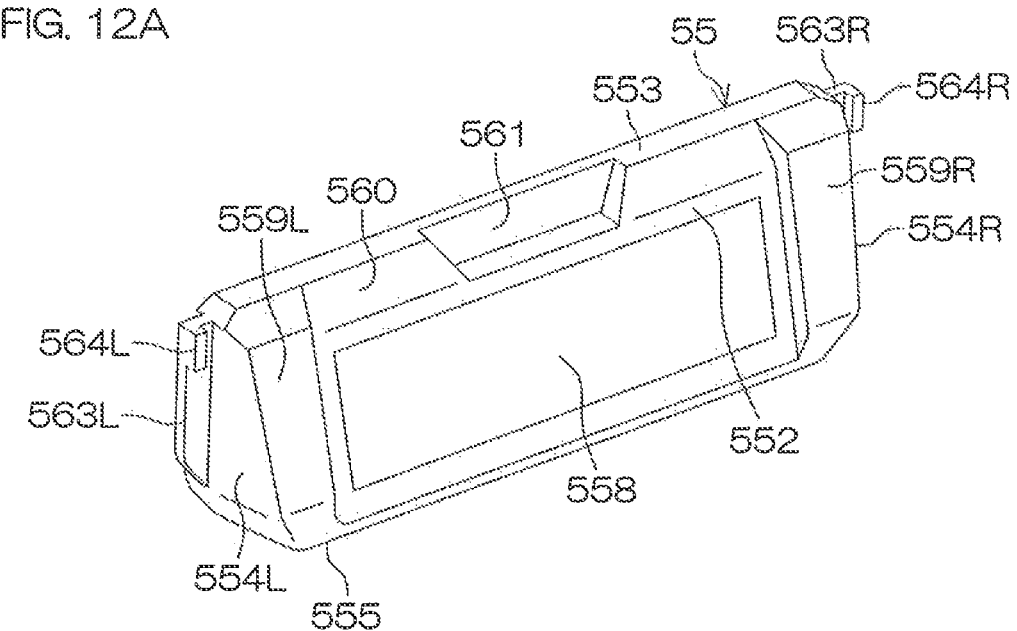
FIG. 12A is a perspective view of a tail gate as viewed from an outer surface side.
Figure 12B:
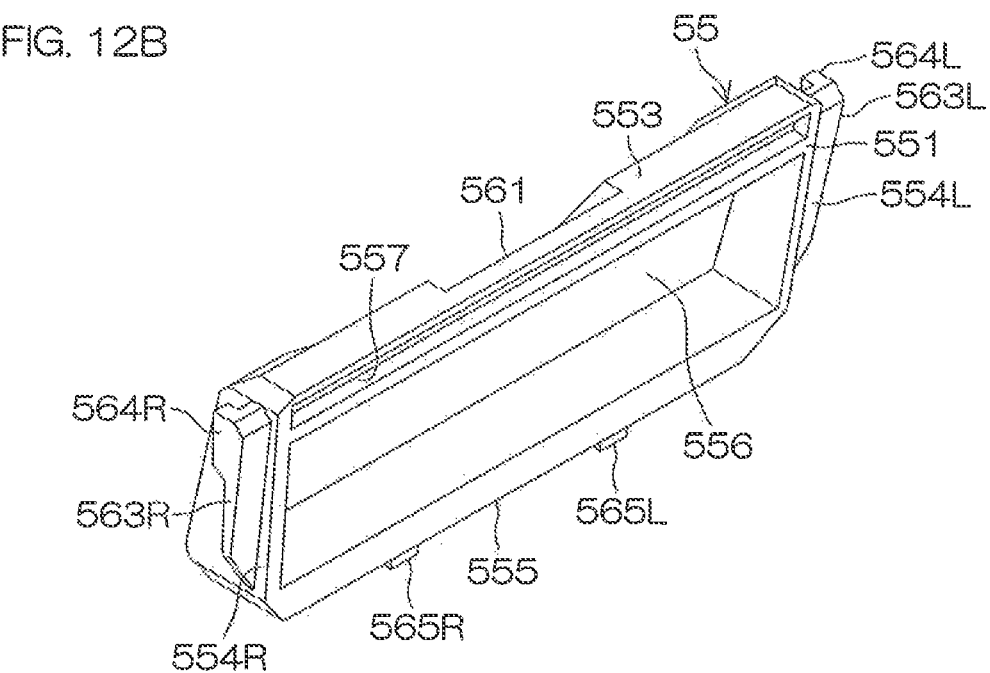
FIG. 12B is a perspective view of the tail gate as viewed from an inner surface side.

FIG. 12A and FIG. 12B are perspective views of the tail gate 55. More specifically, FIG. 12A is a perspective view as viewed from an outer surface 552 side, and FIG. 12B is a perspective view as viewed from an inner surface 551 side. The tail gate 55 includes the inner surface 551 as a first principal surface and the outer surface 552 as a second principal surface. The inner surface 551 and the outer surface 552 are on opposite sides of the tail gate 55. The tail gate 55 includes a top surface 553, a left side surface 554L, a right side surface 554R, and a bottom surface 555 between the inner surface 551 and the outer surface 552.

The inner surface 551 of the tail gate 55 is a surface that faces the cargo accommodation space of the cargo bed 10 when the tail gate 55 is held in the first groove portions 201L and 201R. The outer surface 552 of the tail gate 55 is a surface facing the opposite side of the cargo accommodation space of the cargo bed 10 in a state where the tail gate 55 is held in the first groove portions 201L and 201R. The inner surface 551 and the outer surface 552 preferably have different structures.

The inner surface 551 includes a rectangular or substantially rectangular-shaped depressed portion 556 at the center thereof. A lower end region below the depressed portion 556 on the inner surface 551 of the tail gate 55 faces the step portion 543 (see FIG. 11A and FIG. 11B) when the tail gate 55 is attached to the first groove portions 201L and 201R. In the attached state, the depressed portion 556 is arranged at a higher position than that of the step portion 543. The depressed portion 556 contributes to an increase in volume of the cargo accommodation space. Above the depressed portion 556, a gripping depression 557 is defined at an upper end of the inner surface 551. The gripping depression 557 extends to elongate in the left-right direction. It is arranged such that a user can insert fingers into the gripping depression 557. When the user inserts fingers into the gripping depression 557, it is possible to hold the tail gate 55. Therefore, the gripping depression 557 facilitates a work of attaching and detaching the tail gate 55.

The outer surface 552 mainly provides a design surface. At the center of the outer surface 552, a rectangular or substantially rectangular design region 558 is disposed. At both sides of the design region 558, a pair of projected regions 559L and 559R projecting rearward are arranged to extend in the up-down direction. Between the pair of projected regions 559L and 559R, above the design region 558, an inclined surface 560 inclined upward and forward is provided. At the central portion of the inclined surface 560, a depressed portion 561 depressed forward is provided. The depressed portion 561 makes it easy for a user to hold the tail gate 55.

The left side surface 554L of the tail gate 55 is preferably orthogonal or substantially orthogonal to the inner surface 551 and the outer surface 552, and extends in the up-down direction and the front-back direction. In the left side surface 554L, an elongated protrusion 563L is provided in the up-down direction. The elongated protrusion 563L preferably has a plate shape extending in the up-down direction and the left-right direction, a large thickness in the front-back direction at an upper portion, and a small thickness at a lower portion. That is, as viewed from the side, the elongated protrusion 563L has a tapered shape (wedged shape) tapered downward. The thickness in the front-back direction of the elongated protrusion 563L is smaller than that in the front-back direction of the tail gate 55. The lower end of the elongated protrusion 563L is inclined outward and upward. Thus, the lower end of the elongated protrusion 563L is of a tapered shape as viewed from the front or the back.

At an outer edge of the upper end of the elongated protrusion 563L, a hook-shaped portion 564L is integrally provided. The hook-shaped portion 564L protrudes rearward from the elongated protrusion 563L in a direction from the inner surface 551 toward the outer surface 552. The hook-shaped portion 564L extends in the front-back direction and the up-down direction. The width in the front-back direction of the hook-shaped portion 564L is shorter than the thickness in the front-back direction of the tail gate 55. As viewed from the side, the front side edge and the rear side edge of the hook-shaped portion 564L are positioned between the inner surface 551 and the outer surface 552 of the tail gate 55. The length in the up-down direction of the hook-shaped portion 564L is shorter than that in the up-down direction of the elongated protrusion 563L.

The structure relating to the right side surface 554R of the tail gate 55 is symmetrical with the structure relating to the left side surface 554L. At the right side surface 554R of the tail gate 55, an elongated protrusion 563R is provided. The elongated protrusion 563R has a structure symmetrical with the elongated protrusion 563L. At the outer edge of the upper end of the elongated protrusion 563R, a hook-shaped portion 564R is integrally provided. The hook-shaped portion 564R has a structure symmetrical with the hook-shaped portion 564L.

Figure 13:
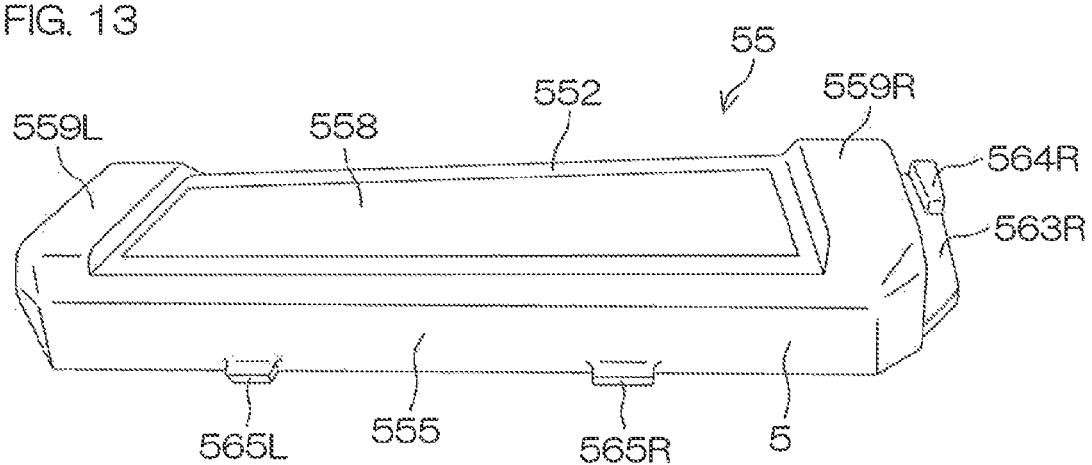
FIG. 13 is a perspective view showing the structure of a bottom surface of the tail gate.

FIG. 13 is a perspective view showing the structure of the bottom surface 555 of the tail gate 55. The bottom surface 555 of the tail gate 55 is a flat or substantially flat surface. At the edge at the inner surface 551 side of the bottom surface 555, a pair of bumps 565L and 565R are provided at a distance spaced part from each other. The bumps 565L and 565R preferably have a rectangular or substantially rectangular plate shape extending in the left-right direction.

As shown in FIG. 11A and FIG. 11B, on the tail gate receiving surface 542 of the bottom wall portion 54, a pair of openings 546L and 546R are provided at a distance spaced apart in the left-right direction so as to align with the bumps 565L and 565R. When the tail gate 55 is held by the first groove portions 201L and 201R, the pair of bumps 565L and 565R are inserted into the pair of openings 546L and 546R, respectively. Thus, a movement, in the front-back direction, of the lower end of the tail gate 55 is reliably regulated.

Similarly, as shown in FIG. 10A, at the front end of the bottom wall portion 54, a pair of openings 547L and 547R are provided at a distance spaced apart in the left-right direction so as to align with the bumps 565L and 565R. When the tail gate 55 is held by the second groove portions 202L and 202R, the pair of bumps 565L and 565R are inserted into the pair of openings 547L and 547R, respectively. Thus, a movement, in the front-back direction, of the lower end of the tail gate 55 is reliably regulated.

Figure 14:
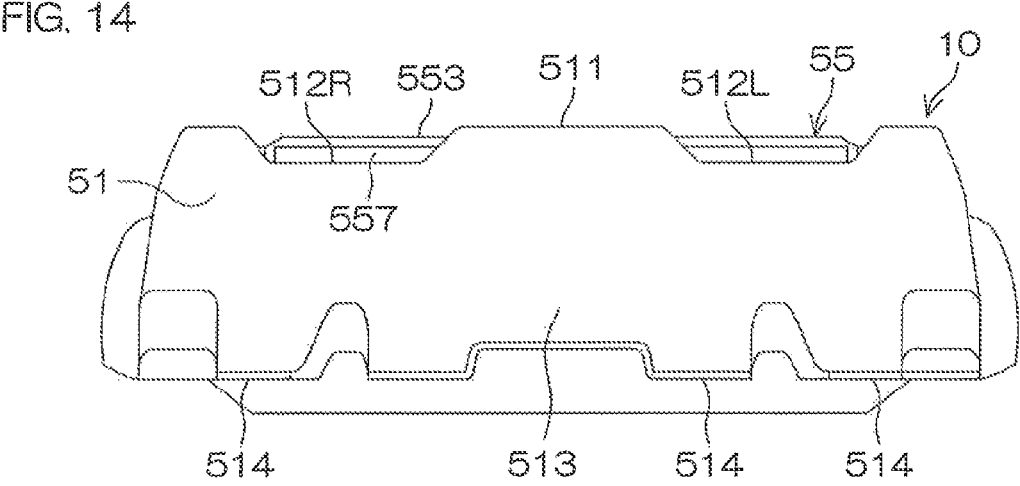
FIG. 14 is a front view of the cargo bed as viewed from a front side in a state where the tail gate is attached to second groove portions.

FIG. 14 is a front view of the cargo bed 10 as viewed from a front side in a state where the tail gate 55 is attached to the second groove portions 202L and 202R. The front wall portion 51 of the cargo bed 10 includes a pair of depressed portions 512L and 512R on an upper surface 511. The pair of depressed portions 512L and 512R are spaced apart a distance in the left-right direction. In the present preferred embodiment, the left depressed portion 512L contacts the second left protruded portion 212L of the left-side wall portion 52, and the right depressed portion 512R contacts the second right protruded portion 212R of the right-side wall portion 53 (see FIG. 10A and FIG. 10B). In the present preferred embodiment, the depressed portions 512L and 512R preferably each have a trapezoidal shape as viewed from the front, and preferably each have a flat bottom surface. When the tail gate 55 is held by the second groove portions 202L and 202R, the bottom surfaces of the depressed portions 512L and 512R are located lower than the top surface 553 of the tail gate 55. Therefore, it is possible for a user to hold the tail gate 55 by accessing the tail gate 55 from a front side of the front wall portion 51. Further, the bottom surfaces of the depressed portions 512L and 512R are lower than the gripping depression 557 provided on the inner surface 551 of the tail gate 55. Therefore, it is possible for a user to easily grip the tail gate 55 by accessing the gripping depression 557 of the tail gate 55 from a front side of the front wall portion 51.

A front surface 513 of the front wall portion 51 is an inclined surface inclined frontward and downward. The front surface 513 is inclined to run along the inclination of the backrest 137 (see FIG. 2). At a lower end at the front surface 513 side of the front wall portion 51, a linkage portion 514 is provided which couples the cargo bed 10 to the frame 4. In the linkage portion 514, a hole 515 through which a bolt (not shown) screwed into the frame 4 is inserted is provided (see FIG. 10B).

Figure 15B:
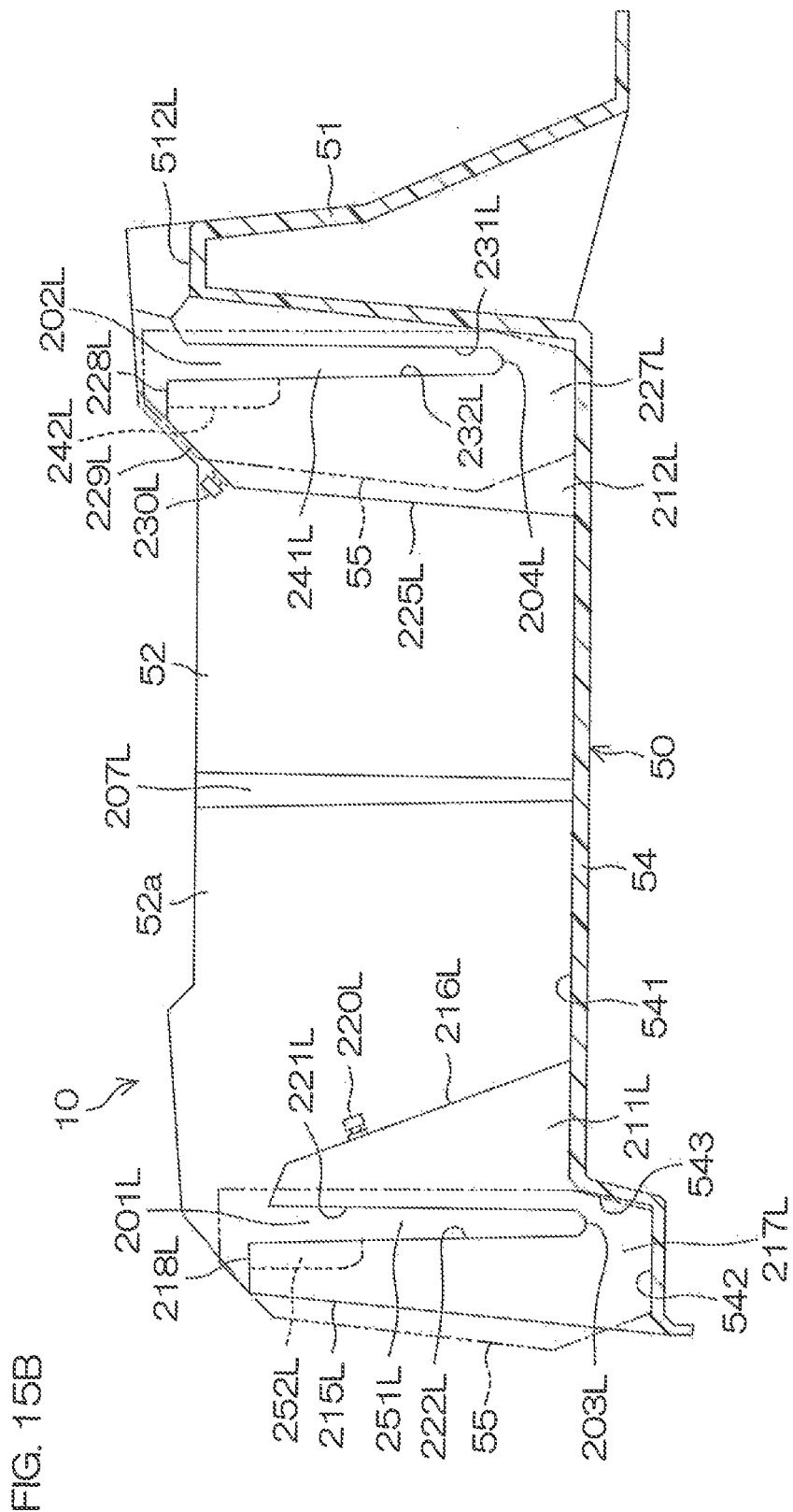
FIG. 15B is an illustrative vertical sectional view for describing the structure of a left-side wall portion of the cargo bed.

FIG. 15A is an illustrative vertical sectional view for describing the structure of the right-side wall portion 53 of the cargo bed 10, and FIG. 15B is an illustrative vertical sectional view for describing the structure of the left-side wall portion 52 of the cargo bed 10.

The first right protruded portion 211R is disposed at the rear end of the right-side wall portion 53. The first right protruded portion 211R includes a rear surface 215R, a front surface 216R, a lateral surface 217R, and a top surface 218R. The rear surface 215R is orthogonal or substantially orthogonal to the inner wall surface 53a of the right-side wall portion 53 and extends perpendicularly or substantially perpendicularly from a rear end edge of the bottom wall portion 54. More precisely, in the present preferred embodiment, the rear surface 215R is inclined slightly forward with respect to the vertical direction. The front surface 216R is orthogonal or substantially orthogonal to the inner wall surface 53a of the right-side wall portion 53, is positioned forward with respect to the rear surface 215R, and is obliquely raised rearward and upward from the bottom wall portion 54. The lateral surface 217R is parallel or substantially parallel with the inner wall surface 53a of the right-side wall portion 53. The lateral surface 217R communicates with an inner edge of the rear surface 215R and an inner edge of the front surface 216R. The top surface 218R communicates with an upper edge of the rear surface 215R, an upper edge of the front surface 216R, and an upper edge of the lateral surface 217R. Downward from the intermediate portion, in the front-back direction, of the top surface 218R, the first right groove portion 201R is provided.

The first right groove portion 201R is opened to the lateral surface 217R. As viewed from the side, the first right groove portion 201R has a tapered shape tapered downward. That is, the first right groove portion 201R includes a front wall surface 221R and a rear wall surface 222R, and a distance therebetween is the largest at the upper end and the smallest at the lower end. The front wall surface 221R is slightly inclined rearward and downward, and the rear wall surface 222R is slightly inclined forward and downward.

On the front surface 216R of the first right protruded portion 211R, a first coupling portion 220R is provided. The first coupling portion 220R is used to fix the tail gate 55 attached to the first groove portions 201L and 201R to the bed portion 50 and to prevent it from falling off.

The second right protruded portion 212R is disposed at the front end of the right-side wall portion 53. The second right protruded portion 212R is integral with the front wall portion 51. The second right protruded portion 212R includes a rear surface 225R, a lateral surface 227R, and a top surface 228R. The rear surface 225R crosses the inner wall surface 53a of the right-side wall portion 53 and extends vertically or substantially vertically from the bottom wall portion 54. More precisely, in the present preferred embodiment, the rear surface 225R is inclined slightly forward with respect to the vertical direction. The lateral surface 217R is parallel or substantially parallel with the inner wall surface 53a of the right-side wall portion 53. The lateral surface 217R communicates with an inner edge of the rear surface 215R and extends forward to communicate with the rear surface of the front wall portion 51. The top surface 228R communicates with an upper edge of the rear surface 225R and an upper edge of the lateral surface 217R. At a position forward of the top surface 228R, the second right groove portion 202R is downwardly provided. The front portion of the second right protruded portion 212R is integral with the right end of the front wall portion 51 and defines the depressed portion 512R at the right side.

The second right groove portion 202R is opened to the lateral surface 227R. The second right groove portion 202R has a tapered shape tapered downward. That is, the second right groove portion 202R includes a front wall surface 231R and a rear wall surface 232R, and a distance therebetween is the largest at the upper end and the smallest at the lower end. The front wall surface 231R is slightly inclined rearward and downward, and the rear wall surface 232R is slightly inclined forward and downward.

The top surface 228R includes an inclined surface 229R rearward of the second right groove portion 202R. On the inclined surface 229R, a second coupling portion 230R is provided. The second coupling portion 230R is used to fix the tail gate 55 attached to the second groove portions 202L and 202R to the bed portion 50 and to prevent it from falling off.

A bottom portion 204R of the second right groove portion 202R is located at a higher position than that of a bottom portion 203R of the first right groove portion 201R. Thus, when the tail gate 55 is held by the second groove portions 202L and 202R, the tail gate 55 is positioned higher than when held by the first groove portions 201L and 201R.

The arrangement related to the left-side wall portion 52 is symmetrical with the arrangement related to the right-side wall portion 53. Therefore, the arrangement related to the left-side wall portion 52 will not be described, and is shown in the attached drawings with the same reference sign numerals as those designated to the arrangement of the right-side wall portion 53 followed by the alphabetical letter "L".

FIG. 16 is an enlarged perspective view showing the arrangement of the second right groove portion 202R. The second right groove portion 202R includes a tapered groove portion 241R and a hook groove portion 242R.

The tapered groove portion 241R extends in the up-down direction and is opened to the top surface 228R and the lateral surface 227R of the second right protruded portion 212R. The tapered groove portion 241R has a shape corresponding to the elongated protrusion 563R provided on the right side surface 554R of the tail gate 55. Specifically, the tapered groove portion 241R is defined by the front wall surface 231R, the rear wall surface 232R, a side wall surface 233R, and a bottom wall surface 234R. The front wall surface 231R is an inclined surface that extends in the left-right direction and is inclined downward and rearward. The rear wall surface 232R is an inclined surface that extends in the left-right direction and is inclined downward and forward. A distance, in the front-back direction, between the front wall surface 231R and the rear wall surface 232R is the largest at an upper end and the smallest at a lower end. Therefore, as viewed from the side, the tapered groove portion 241R has a shape tapered downward. A distance, in the front-back direction, at the upper end is larger than a thickness, in the front-back direction, at the upper end of the elongated protrusion 563R. A distance, in the front-back direction, at the lower end is less than the thickness, in the front-back direction, at the upper end of the elongated protrusion 563R. Therefore, between the upper end and the lower end, there is a position at which the distance, in the front-back direction, is equal to the thickness at the upper end of the elongated protrusion 563R. The side wall surface 233R extends in the front-back direction to couple outer end edges of the front wall surface 231R and the rear wall surface 232R. The bottom wall surface 234R couples lower ends of the front wall surface 231R, the rear wall surface 232R, and the side wall surface 233R. In the present preferred embodiment, the bottom wall surface 234R extends outward and upward, and is inclined relative to the floor surface of the bottom wall portion 54.

The hook groove portion 242R is disposed rearward of the tapered groove portion 241R, and preferably has a shape matching the hook-shaped portion 564R of the right side surface 554R of the tail gate 55. The hook groove portion 242R communicates with an upper portion of the tapered groove portion 241R. The length in the up-down direction of the hook groove portion 242R is shorter than that in the up-down direction of the tapered groove portion 241R. The hook groove portion 242R is opened at the top surface of the second right protruded portion 212R, and is opened at the rear wall surface 232R of the tapered groove portion 241R. The hook groove portion 242R includes an outer wall surface 245R, an inner wall surface 246R, a rear wall surface 247R, and a bottom wall surface 248R. The outer wall surface 245R lies on the same plane of the side wall surface 233R of the tapered groove portion 241R, and is continuous to the side wall surface 233R. The inner wall surface 246R is positioned inside of the outer wall surface 245R, and faces the outer wall surface 245R in the left-right direction. The inner wall surface 246R extends in the front-back direction and the up-down direction, and in a plan view, runs along a plane orthogonal or substantially orthogonal to the rear wall surface 232R of the tapered groove portion 241R. Rear edges of the outer wall surface 245R and the inner wall surface 246R are each coupled to left and right side edges of the rear wall surface 247R. The rear wall surface 247R extends in the left-right direction and the up-down direction. The bottom wall surface 248R lies at a position higher than the bottom wall surface 234R of the tapered groove portion 241R, and extends in the front-back direction and the left-right direction. Lower edges of the outer wall surface 245R, the inner wall surface 246R, and the rear wall surface 247R are each coupled to left and right side edges and a rear edge of the bottom wall surface 248R.

Except for a difference in height, the arrangement of the first right groove portion 201R is substantially similar to the arrangement of the second right groove portion 202R. That is, the first right groove portion 201R includes a tapered groove portion 251R and a hook groove portion 252R. The tapered groove portion 251R is arranged similar to the tapered groove portion 241R of the second right groove portion 202R. The hook groove portion 252R is arranged similar to the hook groove portion 242R of the second right groove portion 202R.

The arrangement of the second left groove portion 202L is symmetrical with the arrangement of the second right groove portion 202R. Therefore, the arrangement related to the second left groove portion 202L will not be described and is shown in the attached drawings with the same reference sign numerals as those designated to the arrangement of the second right groove portion 202R followed by the alphabetical letter "L".

The arrangement of the first left groove portion 201L is symmetrical with the arrangement of the first right groove portion 201R. Therefore, the arrangement related to the first left groove portion 201L will not be described, and is shown in the attached drawings with the same reference sign numerals as those designated to the arrangement of the first right groove portion 201R followed by the alphabetical letter "L".

When the tail gate 55 is inserted into the first groove portions 201L and 201R in the regular posture in which the inner surface 551 is oriented forward, the elongated protrusions 563L and 563R are inserted into the tapered groove portions 251L and 251R and the hook-shaped portions 564L and 564R are inserted into the hook groove portions 252L and 252R. As a result, the elongated protrusions 563L and 563R and the hook-shaped portions 564L and 564R are inserted completely into the first groove portions 201L and 201R and reach the attachment position of the first groove portions 201L and 201R. Thus, the bottom surface 555 of the tail gate 55 abuts on the bottom wall portion 54 (tail gate receiving surface 542) of the bed portion 50 so that it is possible to attach the tail gate 55 to a complete attachment position.

Similarly, when the tail gate 55 is inserted into the second groove portions 202L and 202R in the regular posture in which the inner surface 551 is oriented forward, the elongated protrusions 563L and 563R are inserted into the tapered groove portions 241L and 241R and the hook-shaped portions 564L and 564R are inserted into the hook groove portions 242L and 242R. As a result, the elongated protrusions 563L and 563R and the hook-shaped portions 564L and 564R are inserted completely into the second groove portions 202L and 202R and reach the attachment position of the second groove portions 202L and 202R. Thus, the bottom surface 555 of the tail gate 55 abuts on the bottom wall portion 54 (cargo receiving surface 541) of the bed portion 50 so that it is possible to attach the tail gate 55 to a complete attachment position.

Figure 17A:
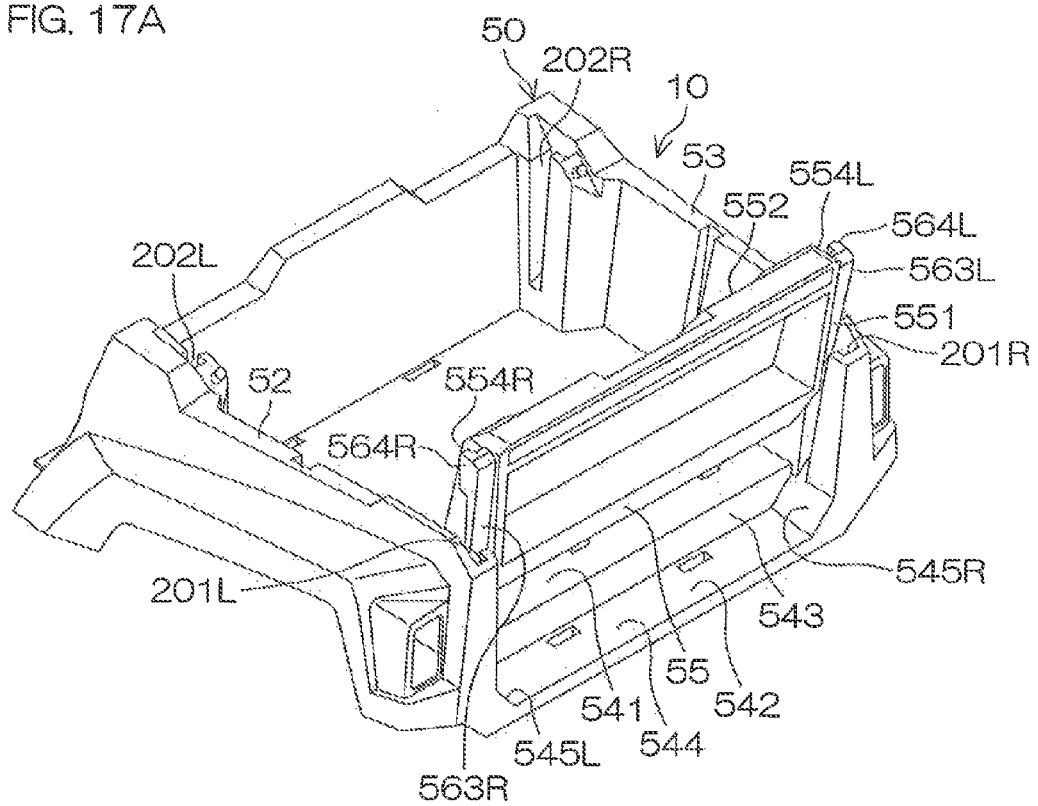
FIG. 17A is a perspective view showing a state where the tail gate is to be attached to first groove portions in a back-to-front inverted posture.
Figure 17B:
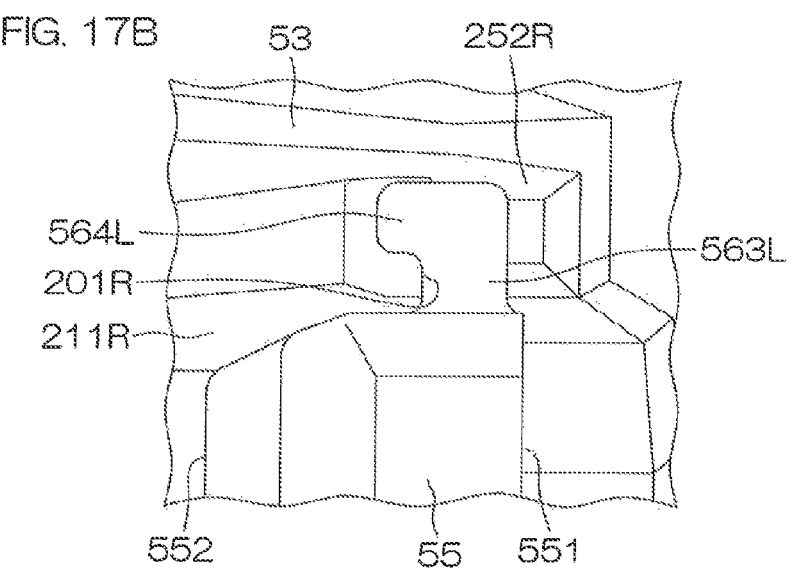
FIG. 17B is a partially enlarged plan view of a vicinity of the first right groove portion in the same state.

FIG. 17A shows a state where the tail gate 55 in a back-to-front inverted posture is attached to the first groove portions 201L and 201R. FIG. 17B is a partial plan view showing a vicinity of the first right groove portion 201R in the above state. The hook-shaped portions 564L and 564R provided in the side surfaces 554L and 554R of the tail gate 55 extend to the outer surface 552 side of the tail gate 55, relative to the elongated protrusions 563L and 563R, and no hook-shaped portions are provided at the inner surface 551 side. Further, the hook groove portions 252L and 252R of the first groove portions 201L and 201R extend rearward from the tapered groove portions 251L and 251R, and no hook groove portion is provided at a front side of the tapered groove portions 251L and 251R. That is, the hook-shaped portions 564L and 564R of the tail gate 55 are asymmetrical in the front-back direction with respect to the elongated protrusions 563L and 563R. Moreover, in the corresponding first groove portions 201L and 201R, the hook groove portions 252L and 252R are also asymmetrical in the front-back direction with respect to the tapered groove portions 251L and 251R.

When the tail gate 55 in the back-to-front inverted posture in which the outer surface 552 of the tail gate 55 is oriented forward is to be attached to the first groove portions 201L and 201R, the elongated protrusions 563L and 563R are received up to a middle point of the tapered groove portions 251L and 251R. However, the hook-shaped portions 564L and 564R interfere with the top surfaces 218L and 218R of the first protruded portions 211L and 211R. Thus, it is not possible to deeply insert the elongated protrusions 563L and 563R into the tapered groove portions 251L and 251R. As a result, it is not possible to completely attach the tail gate 55. As described above, the first groove portions 201L and 201R are arranged to receive, in the attachment position, the tail gate 55 in the regular posture in which the inner surface 551 is oriented forward, and to regulate reception of the tail gate 55 in the attachment position when the tail gate 55 is in the back-to-front inverted posture.

The second groove portions 202L and 202R provided in the front ends of the side wall portions 52 and 53 are arranged essentially similar to the first groove portions 201L and 201R except for the difference in height, are arranged such that the hook groove portions 242L and 242R are provided at only a rear of the tapered groove portions 241L and 241R, and are asymmetrical in the front-back direction to the tapered groove portions 241L and 241R. Thus, it is not possible to completely attach the tail gate 55 in the back-to-front inverted posture, to the second groove portions 202L and 202R, either. That is, the second groove portions 202L and 202R are arranged to receive, in the attachment position, the tail gate 55 in the regular posture in which the inner surface 551 is oriented forward, and to regulate reception of the tail gate 55 in the attachment position when the tail gate 55 is in the back-to-front inverted posture.

The elongated protrusions 563L and 563R provided at the side surfaces 554L and 554R of the tail gate 55 have a tapered shape (wedge shape) tapered from upward to downward. Corresponding thereto, the tapered groove portions 251L and 251R, 241L and 241R of the first groove portions 201L and 201R, and the second groove portions 202L and 202R have a width narrower in the front-back direction from upward toward downward. Therefore, even in a vertically inverted posture obtained by vertically inverting the tail gate 55, it is not possible, either, to attach the tail gate 55 to the first groove portions 201L and 201R or the second groove portions 202L and 202R.

Thus, in the present preferred embodiment, the tail gate 55, the first groove portions 201L and 201R, and the second groove portions 202L and 202R are arranged so that the tail gate 55 can be inserted into the attachment position only in the regular posture. Because the tail gate 55 can be attached to the first groove portions 201L and 201R only in the regular posture, it is possible to ensure that the inner surface 551 on which the depressed portion 556 is provided faces the cargo accommodation space. Thus, it is possible to maximize the volume in the cargo accommodation space. Further, the bumps 565L and 565R are inserted into the openings 546L and 546R of the tail gate receiving surface 542, and therefore, it is possible to prevent the lower end of the tail gate 55 from being moved rearward when the lower end is pushed by the cargo.

Figure 18:
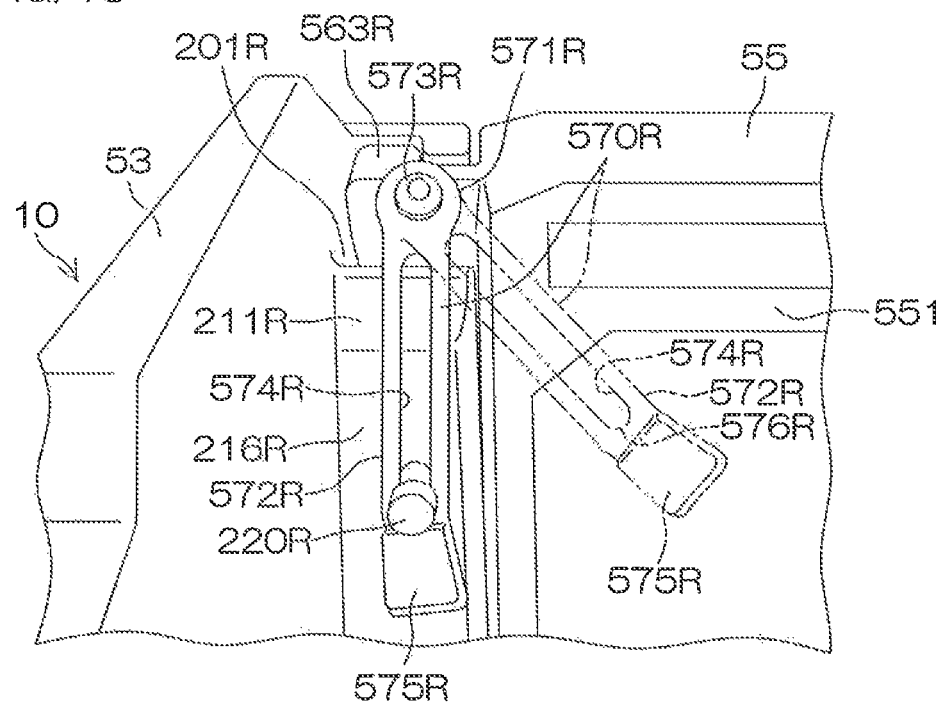
FIG. 18 is an enlarged perspective view showing a structure to fix the tail gate to a rear end of the cargo bed.

FIG. 18 is an enlarged perspective view showing a structure to fix the tail gate 55 to the rear end of the bed portion 50. To the right end at an upper edge of the tail gate 55, a linkage member 570R is coupled at the inner surface 551 side. In the present preferred embodiment, the linkage member 570R is a belt-shaped member, and includes an elastic material, for example, a rubber material.

The linkage member 570R includes a fixed end 571R and a free end 572R. The fixed end 571R of the linkage member 570R is coupled to the tail gate 55 by a coupling pin 573R. The coupling pin 573R is fixed to the right end at the upper edge of the inner surface 551 of the tail gate 55. More specifically, the coupling pin 573R is fixed to the upper end at the inner surface 551 side of the elongated protrusion 563R. The linkage member 570R is configured to be pivoted around the coupling pin 573R.

The free end 572R of the linkage member 570R can be moved in accordance with the pivoting around the coupling pin 573R by the linkage member 570R, and can be moved in accordance with elastic deformation of the linkage member 570R. In the intermediate portion of the linkage member 570R, an elongated hole 574R is defined which extends along the longitudinal direction up to near the free end 572R from near the fixed end 571R. In the free end 572R of the linkage member 570R, a handle portion 575R used for gripping by a user is provided.

On the front surface 216R of the first right protruded portion 211R, the first coupling portion 220R is provided. In the present preferred embodiment, the first coupling portion 220R preferably includes a pin member fixed to the first right protruded portion 211R. When the tail gate 55 is attached to the first groove portions 201L and 201R, the user holds the handle portion 575R, guides the free end 572R of the linkage member 570R to near the first coupling portion 220R, and inserts the first coupling portion 220R through the elongated hole 574R.

A length of the linkage member 570R, in a free state, from the fixed end 571R to a tip end 576R of the elongated hole 574R is set to be slightly shorter than a distance measured, along the linkage member 570R, from the coupling pin 573R of the tail gate 55 attached to the first groove portion 201R to the first coupling portion 220R. The user stretches the linkage member 570R and passes the first coupling portion 220R through the elongated hole 574R. When the user releases a hand from the handle portion 575R, the linkage member 570R recovers due to its elasticity, and the elastic recovery force thereof keeps the coupling between the first coupling portion 220R and the linkage member 570R. Thus, the tail gate 55 attached to the first groove portions 201L and 201R is fixed to the bed portion 50 by the linkage member 570R, and is prevented from falling off from the first groove portions 201L and 201R.

When the tail gate 55 is removed from the first groove portions 201L and 201R, the user stretches the linkage member 570R by holding the handle portion 575R of the linkage member 570R to separate the first coupling portion 220R from the elongated hole 574R (see the linkage member 570R shown with an alternate long and two short dashed line). Thus, the user can slide the tail gate 55 upwardly, and then, remove the tail gate 55 from the first groove portions 201L and 201R.

A similar structure is provided to fix the left end of the tail gate 55 and the first left protruded portion 211L. The structure is symmetrical with the structure described with respect to the right end of the tail gate 55 and the first right protruded portion 211R. Each portion of the structure associated with the left end of the tail gate 55 and the first left protruded portion 211L will not be described, and is shown in the attached drawings with the same reference sign numeral as that assigned to each portion of the structure associated with the right end of the tail gate 55 and the first right protruded portion 211R followed by the alphabetical letter "L".

Figure 19:
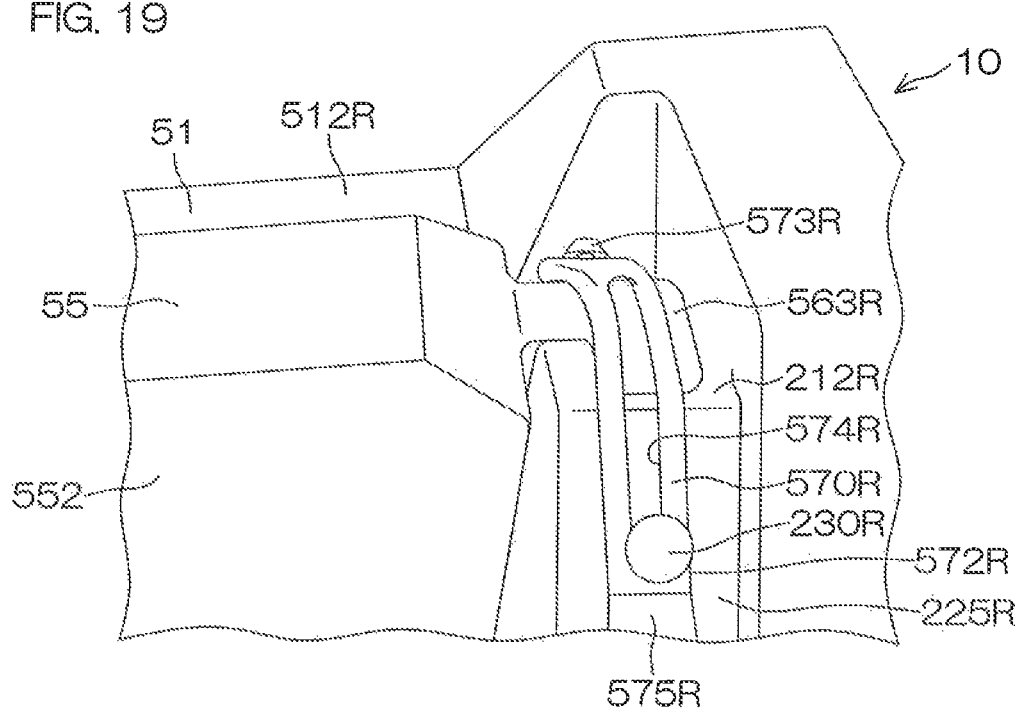
FIG. 19 is an enlarged perspective view showing the structure to fix the tail gate to a front end of the cargo bed.

FIG. 19 is an enlarged perspective view showing the structure to fix the tail gate 55 to the front end of the bed portion 50. The second coupling portion 230R is provided on the rear surface 225R of the second right protruded portion 212R. In the present preferred embodiment, the second coupling portion 230R is a pin member fixed to the second right protruded portion 212R.

When the tail gate 55 is attached to the second groove portions 202L and 202R, the user can orient the free end 572R toward the outer surface 552 of the tail gate 55 by pivoting the linkage member 570R around the coupling pin 573R. The user can further introduce the free end 572R to near the second coupling portion 230R by holding the handle portion 575R. The linkage member 570R is elastically bent and deformed over the elongated protrusion 563R from the inner surface 551 (front surface) side of the tail gate 55 to the outer surface 552 (rear surface) side thereof. The user can pass the second coupling portion 230R through the elongated hole 574R by operating the handle portion 575R.

A length of the linkage member 570R, in a free state, from the fixed end 571R to the tip end 576R of the elongated hole 574R is set to be shorter than a distance measured, along the linkage member 570R, from the coupling pin 573R of the tail gate 55 attached to the second groove portion and 202R to the second coupling portion 230R. Therefore, the user will stretch the linkage member 570R and pass the second coupling portion 230R through the elongated hole 574R. When the user releases a hand from the handle portion 575R, the linkage member 570R recovers due to its elasticity, and the elastic recovery force keeps the coupling between the second coupling portion 230R and the linkage member 570R. Thus, the tail gate 55 attached to the second groove portions 202L and 202R is fixed, by the linkage member 570R, to the bed portion 50, and is prevented from falling off from the second groove portions 202L and 202R.

When the tail gate 55 is removed from the second groove portions 202L and 202R, the user stretches the linkage member 570R by holding the handle portion 575R of the linkage member 570R to separate the elongated hole 574R from the second coupling portion 230R. The user can then slide the tail gate 55 upwardly, and remove the tail gate 55 from the second groove portions 202L and 202R.

A similar structure is provided also to fix the left end of the tail gate 55 and the second left protruded portion 212L. The structure is symmetrical with the structure described with respect to the right end of the tail gate 55 and the second right protruded portion 212R. Each portion of the structure associated with the left end of the tail gate 55 and the second left protruded portion 212L will not be described, and is shown in the attached drawings with the same reference sign numeral as that assigned to each portion of the structure associated with the right end of the tail gate 55 and the second right protruded portion 212R followed by the alphabetical letter "L".

Figure 20:
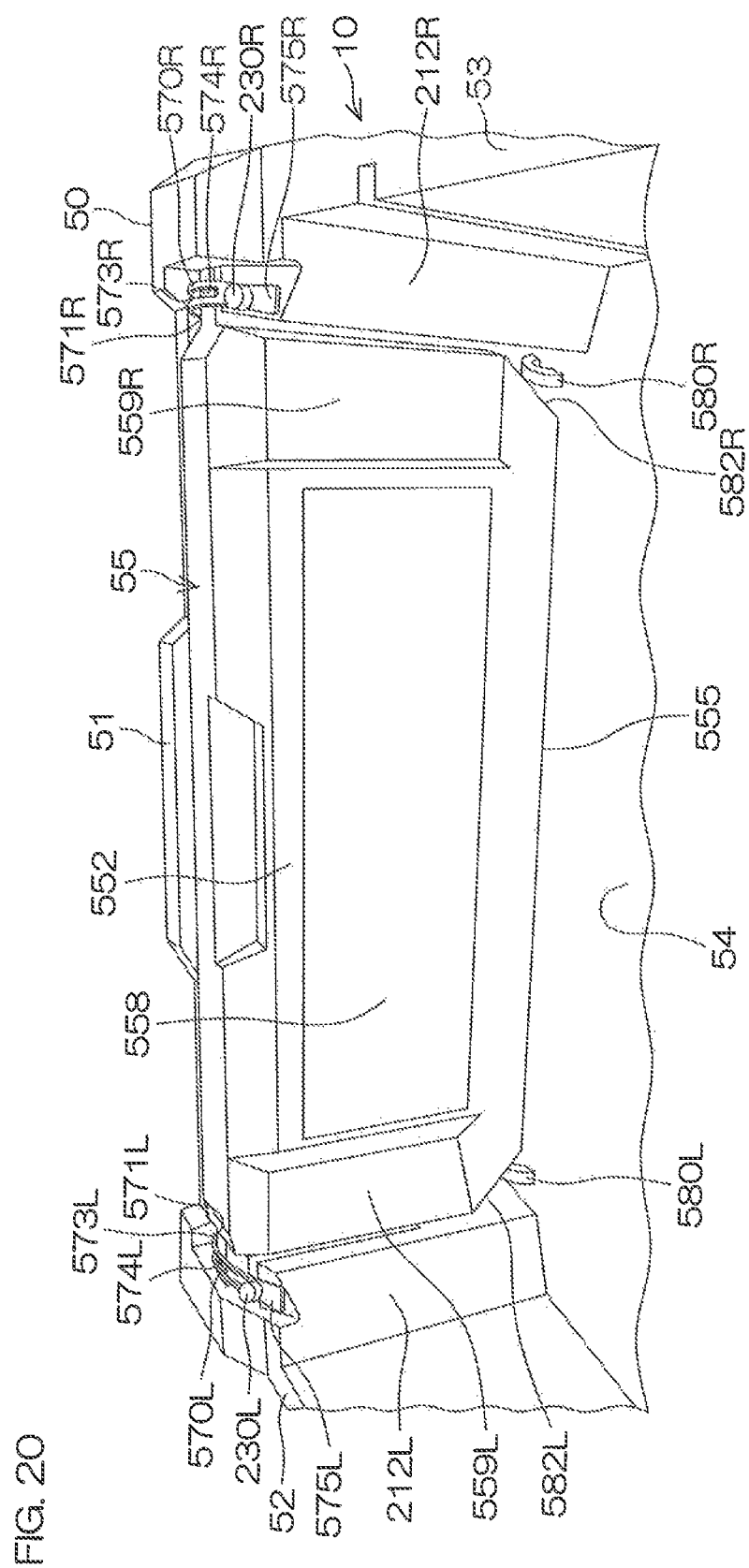
FIG. 20 is an enlarged perspective view showing the arrangement of a vicinity of a front end of a bed portion.

FIG. 20 is an enlarged perspective view showing the arrangement of a vicinity of the front end of the bed portion 50. In the front end of the bottom wall portion 54, near the left-side wall portion 52 and the right-side wall portion 53, a pair of bed hooks 580L and 580R are provided, respectively. In the present preferred embodiment, the left-side bed hook 580L lies near the second left protruded portion 212L, and is arranged at substantially the same position, in the front-back direction, as the second left groove portion 202L. Further, the right-side bed hook 580R lies near the second right protruded portion 212R, and is arranged at substantially the same position, in the front-back direction, as the second right groove portion 202R. When the tail gate 55 is attached to the second groove portions 201L and 201R, the position, in the front-back direction, of the tail gate 55 and the positions, in the front-back direction, of the bed hooks 580L and 580R are substantially equal.

Both ends at a lower end of the tail gate 55 are cut obliquely, and depressed portions 582L and 582R are provided to avoid the bed hooks 580L and 580R. When the bottom surface 555 of the tail gate 55 abuts on the bottom wall portion 54, the bed hooks 580L and 580R are accommodated in respective spaces defined by the depressed portions 582L and 582R, the bottom wall portion 54, and the side wall portions 52 and 53 (the protruded portions 212L and 212R).

As shown in FIG. 11A and FIG. 11B, the tail gate receiving surface 542 provided in the bottom wall portion 54 at the rear end of the cargo bed 10 includes, at both ends, the inclined surface portions 545L and 545R. The inclined surface portions 545L and 545R match the depressed portions 582L and 582R of the tail gate 55. Therefore, in a state where the tail gate 55 is attached to the first groove portions 201L and 201R, the inclined surface portions 545L and 545R extend along the depressed portions 582L and 582R. Thus, the tail gate 55 attached to the first groove portions 201L and 201R completely closes the rear opening 56 of the cargo bed 10.

As described above, in the present preferred embodiment, the left-side and right-side wall portions 52 and 53 include first left and right groove portions 201L and 201R, respectively, extending along the up-down direction. The first groove portions 201L and 201R are arranged such that the left end and the right end of the tail gate 55 are each slidable in the up-down direction and the tail gate 55 is held removably at the first position (rearward position) at which the rear opening 56 is closed. The left-side and right-side wall portions 52 and 53 include the second left and right groove portions 202L and 202R disposed forward with respect to the first groove portions 201L and 201R and extend, along the up-down direction, at the left-side and right-side wall portions 52 and 53. The second groove portions 202L and 202R are arranged such that the left end and the right end of the tail gate 55 are each slidable in the up-down direction and the tail gate 55 is held removably at the second position (frontward position) which is forward with respect to the first position (rearward position).

According to this arrangement, when the tail gate 55 is inserted into the first groove portions 201L and 201R, it is possible to hold the tail gate 55 at the rearward position. The tail gate 55 held at the rearward position closes the rear opening 56 of the bed portion 50. When the tail gate 55 held at the rearward position is slid in the up-down direction, it is possible to remove the tail gate 55 from the first groove portions 201L and 201R. When the tail gate 55 removed from the first groove portions 201L and 201R is inserted into the second groove portions 202L and 202R, it is possible to hold the tail gate 55 at the frontward position. When the tail gate 55 held at the frontward position is slid in the up-down direction, it is possible to remove the tail gate 55 from the second groove portions 202L and 202R. In this manner, it is possible to hold, at the frontward position, the tail gate 55 removed from the rearward position at which the rear opening 56 is closed. In addition, the structure in which the first groove portions 201L and 201R and the second groove portions 202L and 202R are defined in the left-side and right-side wall portions 52 and 53 is simple. Further, a work of attaching and detaching the tail gate 55 to and from the first and second groove portions 201L and 201R and 202L and 202R, respectively, is simple, and accordingly, a work of moving the tail gate 55 between the rearward position and the frontward position is also simple.

In the present preferred embodiment, the first groove portions 201L and 201R are arranged to receive, in an attachment position, the tail gate 55 in the regular posture in which the inner surface 551 is oriented forward, and to regulate reception of the tail gate 55 in the attachment position when the tail gate 55 is in the back-to-front inverted posture in which the outer surface 552 is oriented forward. Thus, it is possible for a user to reliably attach the tail gate 55 in the regular posture to the first groove portions 201L and 201R.

In the present preferred embodiment, the second groove portions 202L and 202R are also arranged similar to the first groove portions 201L and 201R. That is, the second groove portions 202L and 202R are arranged to receive, in the attachment position, the tail gate 55 in the regular posture in which the inner surface 551 is oriented forward, and to regulate reception of the tail gate 55 in the attachment position when the tail gate 55 is in the back-to-front inverted posture in which the outer surface 552 is oriented forward.

Further, in the present preferred embodiment, the first groove portions 201L and 201R are arranged such that insertion of both ends of the tail gate 55 in the back-to-front inverted posture in which the outer surface 552 is oriented forward is restricted to halfway of the attachment position. Thus, it is not possible to insert the tail gate 55 in the back-to-front inverted posture beyond a middle point of the first groove portions 201L and 201R, and therefore, a user reliably notices that the tail gate 55 is not in the regular posture. Therefore, it is possible for a user to reliably attach the tail gate 55 in the regular posture to the first groove portions 201L and 201R. At the inner surface 551 of the tail gate 55, the depressed portion 556 is provided. Thus, when the tail gate 55 in the regular posture is attached to the first groove portions 201L and 201R, it is possible to maximize the cargo accommodation space.

In the present preferred embodiment, the first groove portions 201L and 201R are arranged to receive, in the attachment position (first attachment position), the tail gate 55 in the regular posture in which the inner surface 551 is oriented forward. Further, the second groove portions 202L and 202R are arranged to receive, in the attachment position (second attachment position), the tail gate 55 in the regular posture in which the inner surface 551 is oriented forward. Thus, it is possible to attach the tail gate 55 in the regular posture both to the first groove portions 201L and 201R and to the second groove portions 202L and 202R. Therefore, it is possible for a user to move the tail gate 55 between the first groove portions 201L and 201R (rearward position) and the second groove portions 202L and 202R (frontward position) without changing the posture of the tail gate 55. This further simplifies the work of moving the tail gate 55.

In the present preferred embodiment, the gripping depression 557 to grip the tail gate 55 is provided on the inner surface 551. Therefore, it is possible to improve the ease of handling the tail gate 55 without affecting the design of the outer surface 552. The gripping depression 557 is a gripping portion in a preferred embodiment of the present invention.

In the present preferred embodiment, the gripping depression 557 is provided at the upper end of the tail gate 55. The second groove portions 202L and 202R are disposed at the front end of the left-side and right-side wall portions 52 and 53. In a state where the tail gate 55 in the regular posture in which the inner surface 551 is oriented forward is attached to the second groove portions 202L and 202R, the gripping depression 557 of the tail gate 55 is at a higher position than that of the upper end edge of the front wall portion 51, in a portion corresponding to the depressed portions 512L and 512R. Therefore, when the tail gate 55 is attached to the second groove portions 202L and 202R, the gripping depression 557 is exposed at a higher position than that of the front wall portion 51. Therefore, it is easy for a user to handle the tail gate 55 because it is easy to access the gripping depression 557.

In the present preferred embodiment, the second groove portions 202L and 202R are disposed at the front end of the left-side and right-side wall portions 52 and 53. Therefore, the tail gate 55 held by the second groove portions 202L and 202R is positioned at the front end of the bed portion 50. Therefore, it is possible to hold the tail gate 55 without greatly decreasing the volume of the cargo accommodation space on the bed portion 50.

In the present preferred embodiment, bottom portions 204L and 204R of the second groove portions 202L and 202R are higher than bottom portions 203L, 203R of the first groove portions 201L and 201R. More specifically, the bottom portions 203L, 203R of the first groove portions 201L and 201R are disposed such that when the tail gate 55 is completely attached, the bottom surface 555 of the tail gate 55 is lower than the cargo receiving surface 541 of the bed portion 50 (see FIG. 15A and FIG. 15B). Thus, the tail gate 55 held in the first groove portions 201L and 201R reliably closes the rear opening 56. On the other hand, the bottom portions 204L and 204R of the second groove portions 202L and 202R are disposed such that when the tail gate 55 is completely attached, the bottom surface 555 of the tail gate 55 substantially coincides with the cargo receiving surface 541 of the bed portion 50 (see FIG. 15A and FIG. 15B). Therefore, at the frontward position, the bottom wall portion 54 may not necessarily be provided with a depressed portion in which the lower end of the tail gate 55 is received. As a result, it is possible to simplify the structure of the bed portion 50.

Further, in the present preferred embodiment, in the first left protruded portion 211L and the first right protruded portion 211R each protruding inward from the rear ends of the left-side and right-side wall portions 52 and 53, the first left groove portion 201L and the first right groove portion 201R are provided, respectively. Further, in the second left protruded portion 212L and the second right protruded portion 212R each protruding inward from the left-side and right-side wall portions 52 and 53 forward with respect to the first left and right protruded portions 211L and 211R, the second left groove portion 202L and the second right groove portion 202R are provided, respectively. The distance D3 between the left-side wall portion 52 and the right-side wall portion 53 between the first left and right protruded portions 211L and 211R and the second left and right protruded portions 212L and 212R is wider than the distance D1 between the first left and right protruded portions 211L and 211R. Further, the distance D3 is wider than the distance D2 between the second left and right protruded portions 212L and 212R.

The protruded portions 211L, 211R, 212L, and 212R are provided on the side wall portions 52 and 53, and thus, the side wall portions 52 and 53 each have a great strength. The groove portions 201L, 201R, 202L, and 202R are provided in the protruded portions 211L, 211R, 212L, and 212R, and thus, it is possible to provide a structure to hold the tail gate 55 while maintaining the strength required for the side wall portions 52 and 53. In a portion other than the protruded portions 211L, 211R, 212L, and 212R, the distance between the side wall portions 52 and 53 is wide, and thus, it is possible to secure a large cargo accommodation space.

In the present preferred embodiment, when the tail gate 55 and the bed portion 50 are linked by the linkage members 570L and 570R, it is possible to hold the attachment state of the tail gate 55 to the first groove portions 201L and 201R or to the second groove portions 202L and 202R. Depending on when the tail gate 55 is attached to the first groove portions 201L and 201R and when the tail gate 55 is attached to the second groove portions 202L and 202R, a relative position, relative to the tail gate 55, of the coupling position between the linkage members 570L and 570R and the bed portion 50 differs. Thus, it is possible to increase the degree of design freedom. For example, it is possible to increase the degree of design freedom with respect to the disposition of the first groove portions 201L and 201R and the second groove portions 202L and 202R. Further, it is possible to increase the degree of design freedom with respect to the posture of the tail gate 55 when attached to the first groove portions 201L and 201R or to the second groove portions 202L and 202R. Moreover, it is possible to increase the degree of design freedom with respect to the disposition of the coupling positions between the linkage members 570L and 570R and the bed portion 50.

In the present preferred embodiment, it is possible to couple the linkage members 570L and 570R to the bed portion 50 at inner positions of the bed portion 50, when the tail gate 55 is either at the rearward position or at the frontward position. Therefore, it is possible to provide, inside of the bed portion 50, a coupling mechanism (coupling portions 220L and 220R, 230L, and 230R) to couple the linkage members 570L and 570R.

In the present preferred embodiment, the bed hooks 580L and 580R are preferably provided in the bed portion 50. At the lower end of the tail gate 55, the depressed portions 582L and 582R to avoid the bed hooks 580L and 580R when attached to the second groove portions 202L and 202R are provided at positions corresponding to the bed hooks 580L and 580R. With this arrangement, it is possible to hold the tail gate 55 at the frontward position while avoiding the bed hooks 580L and 580R. Therefore, even when the tail gate 55 is held at the frontward position, the bed hooks 580L and 580R can be used.

In the present preferred embodiment, the tail gate 55 is preferably made from a resin material. With this arrangement, it is possible to easily manufacture the tail gate 55 having both ends that can be inserted into the first and second groove portions 201L and 201R and 202L and 202R, respectively. Further, the tail gate 55 made from a resin material contributes to a weight saving of the cargo bed 10, and thus, contributes to a weight saving of the vehicle 1 as a utility vehicle.

In the present preferred embodiment, the left-side and right-side wall portions 52 and 53 are preferably made from a resin material. With this arrangement, it is possible to easily manufacture the left-side and right-side wall portions 52 and 53 including the first and second groove portions 201L and 201R and 202L and 202R, respectively. Further, the side wall portions 52 and 53 made from a resin material contribute to a weight saving of the cargo bed 10, and thus, contribute to a weight saving of the vehicle 1.

In the present preferred embodiment, the bed portion 50 and the front wall portion 51 are preferably made from a resin material, and the entire cargo bed 10 is preferably made from a resin material. This provides the cargo bed 10 and the vehicle 1 with a weight saving.

The vehicle 1 of the present preferred embodiment provides a utility vehicle including a simple structure to move the tail gate 55 and to hold the tail gate 55 on the vehicle 1.

Thus, preferred embodiments of the present invention have been described. However, the present invention may be implemented in other modes such as the examples listed below.

The second groove portions 202L and 202R may be disposed at positions other than the front ends of the left-side and right-side wall portions 52 and 53, for example, at intermediate positions in the front-back direction. That is, the second groove portions 202L and 202R may be disposed so that the tail gate 55 is held at a position spaced apart at the rear of the front wall portion 51.

The two principal surfaces of the tail gate 55 may have the same or substantially the same structure. In this case, the first groove portions 201L and 201R are preferably arranged to receive, in the complete attachment position, both ends of the tail gate 55, irrespective of which principal surface of the tail gate 55 is oriented forward. Further, irrespective of whether the two principal surfaces of the tail gate 55 have an equal structure or a different structure, the first groove portions 201L and 201R may be arranged to introduce the tail gate 55 to the attachment position both when the tail gate 55 is in the regular posture and when it is in the back-to-front inverted posture. As a result, the user is able to select the posture of the tail gate 55 depending on the situation. Due to a similar reason, the structure of both ends of the first groove portions 201L and 201R and the tail gate 55 may be arranged so that the tail gate 55 can be inserted into the attachment position of the first groove portions 201L and 201R even when the tail gate 55 is in a vertically inverted (upside down) posture obtained by vertically inverting the tail gate 55.

The second groove portions 202L and 202R may be arranged to receive, in the attachment position, the tail gate 55 in the back-to-front inverted posture in which the inner surface is oriented rearward. In this case, the depressed portion 556 faces the cargo accommodation space, and thus, it is possible to increase the cargo accommodation space.

The second groove portions 202L and 202R may be arranged so that the tail gate can be inserted into the attachment position both when the tail gate is in the regular posture and when in the back-to-front inverted posture. As a result, the user is able to select the posture of the tail gate 55 depending on the situation to attach the tail gate 55 into the second groove portion 202L and 202R. Due to a similar reason, the structure of both ends of the second groove portions 202L and 202R and the tail gate 55 may be arranged so that the tail gate 55 can be inserted into the attachment position of the second groove portions 202L and 202R even when the tail gate 55 is in a vertically inverted posture obtained by vertically inverting the tail gate 55.

A gripping depression similar to the gripping depression 557 provided on the inner surface 551 of the tail gate 55 may be provided on the outer surface 552. In this case, the gripping depression 557 of the inner surface 551 may be retained as it is or may be removed. Further, a gripping portion defined by a projected portion may be provided on the inner surface 551 and/or the outer surface 552.

In the depressed portions 512L and 512R of the front wall portion 51, the gripping depression 557 is higher than the upper surface 511 of the front wall portion 51 and is exposed forward. However, the entire gripping depression 557 may be higher than the upper surface 511 of the front wall portion 51, and may thus be exposed forward. Further, the depression of the upper surface 511 of the front wall portion 51 may be provided at only one location (for example, one location at the center in the left-right direction).

The first groove portions 201L and 201R may be provided on the side wall portions 52 and 53 without providing the first protruded portions 211L and 211R. Similarly, the second groove portions 202L and 202R may be provided on the side wall portions 52 and 53 without providing the second protruded portions 212L and 212R. When the protruded portions 211L and 211R, 212L and 212R are not provided, it is possible to increase the volume of the cargo accommodation space.

In either arrangement case, the distance between the first left groove portion 201L and the first right groove portion 201R corresponds to a width in the left-right direction of the tail gate 55, and the distance between the second left groove portion 202L and the second right groove portion 202R corresponds to the width in a left-right direction of the tail gate 55. Therefore, the distance between the first left groove portion 201L and the first right groove portion 201R and the distance between the second left groove portion 202L and the second right groove portion 202R are equal to each other.

The first coupling portions 220L and 220R used to fix the tail gate 55 at the rearward position may be provided on the outer surface of the bed portion 50. Similarly, the second coupling portions 230L and 230R used to fix the tail gate 55 at the frontward position may be disposed on the outer surface (for example, the front surface of the front wall portion 51) of the bed portion 50.

The bed portion 50 may have a metal portion and a resin material portion coupled to the metal portion. As a result, it is possible to increase the strength of the bed portion 50. Similarly, the tail gate 55 may have a metal portion and a resin material portion coupled to the metal portion. As a result, it is possible to increase the strength of the tail gate 55. However, in order to facilitate the movement of the tail gate 55, it is preferable that the entire tail gate 55 is made of a resin material to achieve a weight saving of the tail gate 55.

The vehicle 1 preferably includes the two seat units 5L and 5R arranged to the left and right. However, the vehicle according to the present invention may include three or more seat units arranged in the left-right direction, or may include only one seat unit. Further, the vehicle may include two or more seat rows spaced apart in the front-back direction.

The vehicle 1 preferably includes the front differential device 47 and the rear differential device 48. However, either one or both of the front differential device 47 and the rear differential device 48 may be omitted. Preferably, at least the front differential device 47 is provided. A differential lock mechanism to invalidate a function of either one or both of the front differential device 47 and the rear differential device 48 may be provided. The differential lock mechanism is useful for running on a road on which it is difficult to obtain traction such as a boggy area.

The vehicle 1 preferably includes the pair of front wheels 2L and 2R and the pair of rear wheels 3L and 3R. However, the vehicle may include two or more pairs of the front wheels and/or two or more pairs of the rear wheels.

The vehicle 1 preferably includes an internal combustion engine 31. However, a drive source of the vehicle 1 may include an electric motor.

The vehicle 1 preferably belongs to a category of recreational off road vehicles, for example. However, the vehicle according to the present invention may be other types of vehicles belonging to the category of utility vehicles. Examples of such a utility vehicle include a side-by-side vehicle. Generally, the utility vehicle includes a frame structure and a wheel suitable for running off-road.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cargo bed for a utility vehicle, the cargo bed comprising:
   a bed portion including a left-side wall portion, a right-side wall portion, and a rear opening between rear ends of the left-side wall portion and the right-side wall portion; and
   a tail gate configured to close the rear opening of the bed portion; wherein
   the left-side wall portion includes a first left groove portion and a second left groove portion, and the right-side wall portion includes a first right groove portion and a second right groove portion;
   the first left groove portion and the first right groove portion extend along an up-down direction at the rear ends of the left-side wall portion and the right-side wall portion, respectively, and are arranged such that a left end and a right end of the tail gate are each slidable in the up-down direction in the first left groove portion and the first right groove portion to removably hold the tail gate at a first attachment position at which the rear opening is closed;
   the second left groove portion and the second right groove portion are located forward with respect to the first left groove portion and the first right groove portion and extend along an up-down direction at the left-side wall portion and the right-side wall portion, and are arranged such that the left end and the right end of the tail gate are each slidable in the up-down direction in the second left groove portion and the second right groove portion to removably hold the tail gate at a second attachment position which is forward with respect to the first attachment position;
   the tail gate includes a first principal surface and a second principal surface including surface structures that are different from each other;
   the first principal surface is an inner surface that includes a depressed portion defining a cargo accommodation space of the cargo bed when the tail gate is held in the first left groove portion and the first right groove portion; and
   the second principal surface is an outer surface that faces an opposite side of the cargo accommodation space of the cargo bed when the tail gate is held in the first left groove portion and the first right groove portion.

2. The cargo bed according to claim 1, wherein the first left groove portion and the first right groove portion are arranged to receive, in the first attachment position, the tail gate in a regular posture in which the first principal surface is oriented forward, and to slidably receive the tail gate in the first attachment position when the tail gate is in a back-to-front inverted posture in which the second principal surface is oriented forward.

3. A cargo bed for a utility vehicle, the cargo bed comprising:
   a bed portion including a left-side wall portion, a right-side wall portion, and a rear opening between rear ends of the left-side wall portion and the right-side wall portion; and
   a tail gate configured to close the rear opening of the bed portion; wherein the left-side wall portion includes a first left groove portion and a second left groove portion, and the right-side wall portion includes a first right groove portion and a second right groove portion;

the first left groove portion and the first right groove portion extend along an up-down direction at the rear ends of the left-side wall portion and the right-side wall portion, respectively, and are arranged such that a left end and a right end of the tail gate are each slidable in the up-down direction in the first left groove portion and the first right groove portion to removably hold the tail gate at a first attachment position at which the rear opening is closed;

the second left groove portion and the second right groove portion are located forward with respect to the first left groove portion and the first right groove portion and extend along an up-down direction at the left-side wall portion and the right-side wall portion, and are arranged such that the left end and the right end of the tail gate are each slidable in the up-down direction in the second left groove portion and the second right groove portion to removably hold the tail gate at a second attachment position which is forward with respect to the first attachment position;

the tail gate includes a first principal surface and a second principal surface including surface structures that are different from each other;

the first principal surface is an inner surface that includes a cargo accommodation space of the cargo bed when the tail gate is held in the first left groove portion and the first right groove portion;

the second principal surface is an outer surface that faces an opposite side of the cargo accommodation space of the cargo bed when the tail gate is held in the first left groove portion and the first right groove portion;

the first left groove portion and the first right groove portion are arranged to receive, in the first attachment position, the tail gate in a regular posture in which the first principal surface is oriented forward, and to slidably receive the tail gate in the first attachment position when the tail gate is in a back-to-front inverted posture in which the second principal surface is oriented forward; and the first left groove portion and the first right groove portion are arranged such that insertion of the left end and the right end of the tail gate in the back-to-front inverted posture in which the second principal surface is oriented forward is restricted to halfway to the first attachment position.

4. The cargo bed according to claim 1, wherein the first left groove portion and the first right groove portion are arranged to receive, in the first attachment position, the tail gate in a regular posture in which the first principal surface is oriented forward; and the second left groove portion and the second right groove portion are arranged to receive, in the second attachment position, the tail gate in the regular posture in which the first principal surface is oriented forward.

5. The cargo bed according to claim 1, wherein a gripping portion to grip the tail gate is provided on the first principal surface.

6. The cargo bed according to claim 5, wherein the bed portion further includes a front wall portion connecting front end edges of the left-side wall portion and the right-side wall portion;

the gripping portion is provided at an upper end of the tail gate;

the second left groove portion and the second right groove portion are arranged at the front end edges of the left-side wall portion and the right-side wall portion; and when the tail gate is in a regular posture, in which the first principal surface is oriented forward, and the tail gate is attached to the second left groove portion and the second right groove portion, at least a portion of the gripping portion of the tail gate is located at a higher position than that of upper end edges of the front wall portion.

7. The cargo bed according to claim 1, wherein the second left groove portion and the second right groove portion are arranged at front ends of the left-side wall portion and the right-side wall portion.

8. A cargo bed for a utility vehicle, the cargo bed comprising:

a bed portion including a left-side wall portion, a right-side wall portion, and a rear opening between rear ends of the left-side wall portion and the right-side wall portion; and a tail gate configured to close the rear opening of the bed portion; wherein the left-side wall portion includes a first left groove portion and a second left groove portion, and the right-side wall portion includes a first right groove portion and a second right groove portion;

the first left groove portion and the first right groove portion extend along an up-down direction at the rear ends of the left-side wall portion and the right-side wall portion, respectively, and are arranged such that a left end and a right end of the tail gate are each slidable in the up-down direction in the first left groove portion and the first right groove portion to removably hold the tail gate at a first attachment position at which the rear opening is closed;

the second left groove portion and the second right groove portion are located forward with respect to the first left groove portion and the first right groove portion and extend along an up-down direction at the left-side wall portion and the right-side wall portion, and are arranged such that the left end and the right end of the tail gate are each slidable in the up-down direction in the second left groove portion and the second right groove portion to removably hold the tail gate at a second attachment position which is forward with respect to the first attachment position; and a lower end position of the second left groove portion and the second right groove portion is located higher than a lower end position of the first left groove portion and the first right groove portion.

9. A cargo bed for a utility vehicle, the cargo bed comprising:

a bed portion including a left-side wall portion, a right-side wall portion, and a rear opening between rear ends of the left-side wall portion and the right-side wall portion; and a tail gate configured to close the rear opening of the bed portion; wherein the left-side wall portion includes a first left groove portion and a second left groove portion, and the right-side wall portion includes a first right groove portion and a second right groove portion;

the first left groove portion and the first right groove portion extend along an up-down direction at the rear ends of the left-side wall portion and the right-side wall portion, respectively, and are arranged such that a left end and a right end of the tail gate are each slidable in the up-down direction in the first left groove portion and the first right groove portion to removably hold the tail gate at a first attachment position at which the rear opening is closed;

the second left groove portion and the second right groove portion are located forward with respect to the first left groove portion and the first right groove portion and extend along an up-down direction at the left-side wall portion and the right-side wall portion, and are arranged such that the left end and the right end of the tail gate are each slidable in the up-down direction in the second left groove portion and the second right groove portion to removably hold the tail gate at a second attachment position which is forward with respect to the first attachment position;

the first left groove portion and the first right groove portion are provided, respectively, in a first left protruded portion and a first right protruded portion protruding inward from the rear ends of the left-side wall portion and the right-side wall portion;

the second left groove portion and the second right groove portion are provided, respectively, in a second left protruded portion and a second right protruded portion protruding inward from the left-side wall portion and the right-side wall portion forward of the first left protruded portion and the first right protruded portion;

a distance between the left-side wall portion and the right-side wall portion at the first left protruded portion and the first right protruded portion and at the second left protruded portion and the right protruded portion is greater than a distance between the first left protruded portion and the first right protruded portion and a distance between the second left protruded portion and the second right protruded portion;

a left partition-plate groove and a right partition-plate groove are provided, respectively, in the left-side wall portion and the right-side wall portion, the left partition-plate groove is located between the first left protruded portion and the second left protruded portion, and the right partition-plate groove is located between the first right protruded portion and the second right protruded portion; and a distance between the left partition-plate groove and the right partition-plate groove is greater than the distance between the first left protruded portion and the first right protruded portion and greater than the distance between the second left protruded portion and the second right protruded portion.

10. The cargo bed according to claim 1, further comprising:
a linkage member configured to link the tail gate and the bed portion and to hold the tail gate in the first left groove portion and the first right groove portion, or to the second left groove portion and the second right groove portion; wherein
the linkage member and the bed portion are coupled at a different relative position, relative to the tail gate, depending on when the tail gate is held by the first left groove portion and the first right groove portion and when the tail gate is held by the second left groove portion and the second right groove portion.

11. The cargo bed according to claim 10, wherein the linkage member and the bed portion are coupled at an inner position of the bed portion, relative to the tail gate, both when the tail gate is attached to the first left groove portion and the first right groove portion, and when the tail gate is attached to the second left groove portion and the second right groove portion.

12. A cargo bed for a utility vehicle, the cargo bed comprising:
a bed portion including a left-side wall portion, a right-side wall portion, and a rear opening between rear ends of the left-side wall portion and the right-side wall portion; and
a tail gate configured to close the rear opening of the bed portion; wherein
the left-side wall portion includes a first left groove portion and a second left groove portion, and the right-side wall portion includes a first right groove portion and a second right groove portion;
the first left groove portion and the first right groove portion extend along an up-down direction at the rear ends of the left-side wall portion and the right-side wall portion, respectively, and are arranged such that a left end and a right end of the tail gate are each slidable in the up-down direction in the first left groove portion and the first right groove portion to removably hold the tail gate at a first attachment position at which the rear opening is closed;
the second left groove portion and the second right groove portion are located forward with respect to the first left groove portion and the first right groove portion and extend along an up-down direction at the left-side wall portion and the right-side wall portion, and are arranged such that the left end and the right end of the tail gate are each slidable in the up-down direction in the second left groove portion and the second right groove portion to removably hold the tail gate at a second attachment position which is forward with respect to the first attachment position;
a bed hook is provided in the bed portion; and
at a lower end of the tail gate, a depressed portion is provided at a position corresponding to the bed hook to avoid the bed hook when the tail gate is attached to the second left groove portion and the second right groove portion.

13. The cargo bed according to claim 1, wherein the tail gate is made from a resin material.

14. The cargo bed according to claim 1, wherein the left-side wall portion and the right-side wall portion are made from a resin material.

15. A utility vehicle comprising the cargo bed according to claim 1.

16. The cargo bed according to claim 8, wherein the second left groove portion and the second right groove portion are arranged at front ends of the left-side wall portion and the right-side wall portion.

17. The cargo bed according to claim 8, wherein the tail gate is made from a resin material.

18. The cargo bed according to claim 8, wherein the left-side wall portion and the right-side wall portion are made from a resin material.

19. A utility vehicle comprising the cargo bed according to claim 8.

* * * * *